(12) United States Patent
Wolf et al.

(10) Patent No.: US 11,761,879 B2
(45) Date of Patent: Sep. 19, 2023

(54) METHOD FOR PROCESSING AND DISPLAYING MULTI-CHANNEL SPECTRAL HISTOGRAMS AND SYSTEMS FOR SAME

(71) Applicant: Becton, Dickinson and Company, Franklin Lakes, NJ (US)

(72) Inventors: Christopher J. Wolf, San Jose, CA (US); David A. Roberts, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 135 days.

(21) Appl. No.: 17/406,944

(22) Filed: Aug. 19, 2021

(65) Prior Publication Data

US 2022/0107260 A1    Apr. 7, 2022

Related U.S. Application Data

(60) Provisional application No. 63/088,640, filed on Oct. 7, 2020.

(51) Int. Cl.
*G01N 15/14* (2006.01)
*G01N 15/10* (2006.01)

(52) U.S. Cl.
CPC ..... *G01N 15/1429* (2013.01); *G01N 15/1459* (2013.01); *G01N 2015/1006* (2013.01)

(58) Field of Classification Search
CPC .......... G01N 15/1429; G01N 15/1459; G01N 2015/1006; G01N 2015/149
See application file for complete search history.

(56) References Cited

U.S. PATENT DOCUMENTS

| | | | | |
|---|---|---|---|---|
| 5,933,524 A | * | 8/1999 | Schuster | G06T 7/194 382/173 |
| 2004/0119974 A1 | * | 6/2004 | Bishop | G01N 15/1459 250/458.1 |
| 2010/0070904 A1 | | 3/2010 | Zigon et al. | |
| 2013/0226469 A1 | * | 8/2013 | Robinson | G01N 15/1429 702/19 |
| 2020/0098452 A1 | * | 3/2020 | Tatsutani | G01N 15/14 |
| 2022/0003655 A1 | * | 1/2022 | Yamane | G06F 3/14 |

* cited by examiner

*Primary Examiner* — Roy M Punnoose
(74) *Attorney, Agent, or Firm* — Bret E. Field; BOZICEVIC, FIELD & FRANCIS LLP

(57) ABSTRACT

Aspects of the present disclosure include methods for processing and displaying multi-channel spectral histograms. Methods according to certain embodiments include obtaining a histogram of cytometric data for a sample, wherein the cytometric data comprises measurements from particles irradiated in the sample flowing in a flow stream, generating the representation of the histogram by encoding the histogram, the encoding comprising: assigning a color to each histogram value in the representation of the histogram, and duplicating each color corresponding to each histogram value in the representation of the histogram a predetermined number of times, and using the representation of the histogram for displaying the histogram. Systems for practicing the subject methods are also provided. Non-transitory computer readable storage mediums are also described.

20 Claims, 13 Drawing Sheets

METHOD FOR PROCESSING AND DISPLAYING MULTI-CHANNEL SPECTRAL HISTOGRAMS AND SYSTEMS FOR SAME

CROSS-REFERENCE TO RELATED APPLICATION

Pursuant to 35 U.S.C. § 119 (e), this application claims priority to the filing dates of U.S. Provisional Patent Application Ser. No. 63/088,640 filed Oct. 7, 2020, the disclosure of which application is incorporated herein by reference in their entirety.

INTRODUCTION

Flow-type particle detection and analysis systems, such as flow cytometers, are used to detect, analyze and, in some cases, sort particles in a fluid sample based on at least one measured characteristic of the particles. Visualization of data obtained from flow-type particle detection and analysis systems is an important part of the analysis and characterization of collected data and finds use in, for example, biological and medical research.

Visualization of data obtained from flow-type particle detection systems may comprise concurrently displaying multiple histograms of data obtained from several different detector channels of the particle detection system. The simultaneous display of histograms finds use in understanding, analyzing and characterizing particles exposed to the particle detection system as well as configuring the particle detection system by, for example, understanding settings, such as gain level adjustments, necessary to prevent saturation, or otherwise optimize performance, of detection channels of the detection system.

The concurrent display of different histograms is a memory and processing resource-intensive operation and can be a long-latency operation. Such limitations can limit the ability to concurrently display multiple histograms of data and can adversely affect the usefulness of collected data, due to, for example, resulting difficulty properly calibrating the flow-type particle detection and analysis system.

SUMMARY

The present invention introduces novel techniques for more efficiently, in terms of memory and processor resources as well as latency, displaying histograms so that multiple histograms can be displayed concurrently, thereby improving the effectiveness of flow-type particle detection and analysis systems.

Aspects of the present disclosure include methods for processing and displaying multi-channel spectral histograms. Methods according to certain embodiments include obtaining a histogram of cytometric data for a sample, wherein the cytometric data comprises measurements from particles irradiated in the sample flowing in a flow stream, generating the representation of the histogram by encoding the histogram, the encoding comprising: assigning a color to each histogram value in the representation of the histogram, and duplicating each color corresponding to each histogram value in the representation of the histogram a predetermined number of times, and using the representation of the histogram for displaying the histogram.

In some embodiments, the cytometric data comprises light measurements from the particles irradiated in the sample, which in some cases may be measurements of light intensity. In such embodiments, the cytometric data may comprise measurements of one or more of: excitation light that is scattered by the particles along a mostly forward direction, excitation light that is scattered by the particles along a mostly sideways direction, and light emitted from fluorescent molecules or fluorescent dyes used to label the particles in one or more ranges of frequencies.

In some embodiments, the histogram comprises a plurality of bins, and the histogram values are associated with the histogram bins. In such embodiments, each histogram bin may correspond to a range of measurements from the particles irradiated in the sample, the measurements may be light intensity measurements, and the histogram may be a spectral intensity histogram.

In other embodiments, using the representation of the histogram for displaying the histogram comprises using the representation of the histogram for displaying the histogram on a display device. In still other embodiments, the predetermined number is the number of pixels displayed in a lateral direction of the displayed histogram. The predetermined number may be selected based on any desirable width of the displayed histogram. For example, the predetermined number may be one or more, two or more, four or more, 16 or more, 32 or more, 128 or more, 512 or more or 1024 or more. In some embodiments, the shape of the displayed histogram is rectangular, wherein a longitudinal axis of the displayed histogram corresponds to histogram bins, and colors within the displayed histogram correspond to histogram values and different colors in the displayed histogram may correspond to different histogram values.

In some embodiments, the representation of the histogram comprises an array. In such embodiments, assigning a color to each histogram value in the representation of the histogram may comprise assigning an encoding of a display color to elements of the array along a longitudinal axis of the array and/or assigning a color to each histogram value in the representation of the histogram may comprise assigning an encoding of a display color to no more than a single array element at each longitudinal position of the array. In some cases, the longitudinal axis of the array is 256 entries. In other cases, duplicating each color corresponding to each histogram value in the representation of the histogram comprises duplicating elements of the array along a lateral axis of the array. In embodiments, each element of the array corresponds to a pixel in the display of the histogram and/or the elements of the array along a longitudinal axis correspond to pixels of a longitudinal axis in the display of the histogram.

Embodiments of methods according to the present invention may further comprise determining the maximum value in the bins of the histogram, and using the maximum value to determine a scale factor for assigning colors to histogram values. In such embodiments, assigning a color to a histogram value in the representation of the histogram may comprise: using the scale factor to scale the histogram value to produce a scaled histogram value, and assigning a color corresponding to the histogram value based on the scaled histogram value. Such embodiments may further comprise obtaining a color palette comprising available colors for the representation of the histogram, and using the scaled histogram value to access the color palette to determine the color corresponding to the histogram value. In such embodiments, the color palette may be an array of different colors, and using the scaled histogram value to access the color palette comprises using the scaled histogram value to index into the color palette array. In some cases, the color palette comprises 256 colors. Further, eight bits may be used to represent each color in the histogram representation.

In embodiments, colors may be assigned to a plurality of histogram values substantially concurrently. Such embodiments may further comprise using a plurality of parallel processing units to assign colors to a plurality of histogram values substantially concurrently. In some cases, the plurality of parallel processing units comprises a graphics processing unit, which in some cases comprises over one hundred processing units, and each processing unit is configured to substantially concurrently assign a color to a histogram value in the representation of the histogram. In instances, the graphics processing unit is located on a graphics processing card.

In some cases, the graphics processing unit receives as input a one-dimensional array corresponding to the histogram. In other instances, the graphics processing unit outputs a one-dimensional array corresponding to the representation of the histogram. In still other instances, duplicating each color corresponding to each histogram value in the representation of the histogram is not performed by the graphics processing unit.

In some embodiments, generating the representation of the histogram is performed substantially in real time. Methods according to the present invention may further comprise adjusting settings for collecting the cytometric data based on the display of the histogram. In some cases, adjusting settings comprises adjusting a gain setting of a channel of a detector for collecting the cytometric data. In other cases, adjusting a gain setting of a channel of a detector for collecting the cytometric data comprises preventing saturation of the channel of the detector.

According to some embodiments of the present invention, the method may comprise obtaining a plurality of histograms of cytometric data for a sample, generating the representations of the plurality of histograms according to any of the methods discussed herein, and using the representations of the plurality of histograms for displaying the plurality of histograms. In embodiments, each histogram of the plurality of histograms comprises light measurements of the cytometric data obtained by each channel of a plurality of channels of one or more detectors. In other embodiments, each histogram of the plurality of histograms includes the same number of histogram bins. In still other embodiments, corresponding histogram bins of each histogram of the plurality of histograms have the same ranges of measurement values associated with them.

In some embodiments, using the representations of the plurality of histograms for displaying the plurality of histograms comprises using the representations of the plurality of histograms for displaying the plurality of histograms on a display device. In some cases, the representations of the plurality of histograms comprise a two-dimensional array. In such cases, a first dimension of the two-dimensional array may correspond to histogram bins and a second dimension of the two-dimensional array may correspond to the histograms of the plurality of histograms. In embodiments, the representations of more than one histogram are generated substantially concurrently. Other embodiments may further comprise adjusting settings for collecting the cytometric data based on the display of the plurality of histograms. In other cases, adjusting settings comprises adjusting gain settings of one or more channels of one or more detectors for collecting the cytometric data. In still other cases, adjusting gain settings of one or more channels of one or more detectors comprises preventing saturation of the one or more channels of the one or more detectors.

In embodiments, generating the representations of each histogram of the plurality of histograms is performed substantially in real time. In other embodiments, obtaining a histogram of cytometric data for a sample comprises producing the histogram of data measurements from flow cytometrically analyzing the sample.

Systems for practicing the subject methods are also provided. Systems according to certain embodiments include a general purpose processor comprising memory operably coupled to the general purpose processor, wherein the memory comprises instructions stored thereon, which, when executed by the general purpose processor, cause the general purpose processor to: obtain a histogram of cytometric data for a sample, wherein the cytometric data comprises measurements from particles irradiated in the sample flowing in a flow stream, transmit the histogram to a plurality of parallel processing units, receive a representation of the histogram from the plurality of parallel processing units, wherein the representation comprises encodings of colors corresponding to each histogram value, duplicate the encodings of colors corresponding to the histogram values in the representation of the histogram a predetermined number of times, and use the representation of the histogram for displaying the histogram on an output device, and a plurality of parallel processing units, operably connected to the general purpose processor and comprising memory operably coupled to the plurality of parallel processing units, wherein the memory comprises instructions stored thereon, which, when executed by the plurality of parallel processing units, cause the plurality of parallel processing units to: receive the histogram from the general purpose processor, generate the representation of the histogram by encoding the histogram, the encoding comprising assigning an encoding of a color to each histogram value in the representation of the histogram, and transmit the representation of the histogram to the general purpose processor. In some embodiments, systems further comprise a display device operably connected to the general purpose processor, wherein using the representation of the histogram to display the histogram on an output device comprises using the representation of the histogram to display the histogram on the display device.

In embodiments, the representation of the histogram comprises an array and, in some cases, each element of the array corresponds to an output device pixel in the display of the histogram. In some cases, the elements of the array along a longitudinal axis correspond to output device pixels of a longitudinal axis in the display of the histogram.

In some embodiments, the general purpose processor is configured to: determine the maximum value in the bins of the histogram, and use the maximum value to determine a scale factor for assigning colors to histogram values. In such embodiments, assigning an encoding of a color to a histogram value in the representation of the histogram may comprise: using the scale factor to scale the histogram value to produce a scaled histogram value, and assigning a color corresponding to the histogram value based on the scaled histogram value. The general purpose processor may be configured to: obtain a color palette comprising available colors for the histogram representation, and use the scaled histogram value to access the color palette to determine the color corresponding to the histogram value. In some cases, the color palette is an array of different colors, and using the scaled histogram value to access the color palette comprises using the scaled histogram value to index into the color palette array.

In embodiments of systems according to the present invention, the plurality of parallel processing units may be further configured to assign encodings of colors to a plurality of histogram values in the representation of the histogram substantially concurrently. In some cases, the plurality of parallel processing units comprises a graphics processing unit. In other cases, the graphics processing unit comprises over one hundred processing units, and each processing unit is configured to substantially concurrently assign an encoding of a color to a histogram value in the representation of the histogram. In still other cases, the graphics processing unit is located on a graphics processing card.

In other embodiments of systems according to the present invention, the plurality of parallel processing units are further configured to receive a plurality of histograms of the cytometric data from the general purpose processor, generate representations of the plurality of histograms by encoding the plurality of histograms, the encoding comprising assigning an encoding of a color to each histogram value in the representations of the plurality of histograms, and transmit the representations of the plurality of histograms to the general purpose processor, and the general purpose processor is further configured to use the representation of the histogram for displaying the plurality of histograms on the output device. In some cases, the plurality of parallel processing units is further configured to generate representations of more than one histogram substantially concurrently. In other cases, the system is configured to generate representations of the plurality of histograms for displaying the plurality of histograms substantially in real time.

Non-transitory computer readable storage mediums are also described. Non-transitory computer readable storage mediums according to certain embodiments include instructions stored thereon having algorithm for obtaining a histogram of cytometric data for a sample, wherein the cytometric data comprises measurements from particles irradiated in the sample flowing in a flow stream, algorithm for generating the representation of the histogram by encoding the histogram, the encoding comprising: assigning a color to each histogram value in the representation of the histogram, and duplicating each color corresponding to each histogram value in the representation of the histogram a predetermined number of times, and algorithm for using the representation of the histogram for displaying the histogram.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
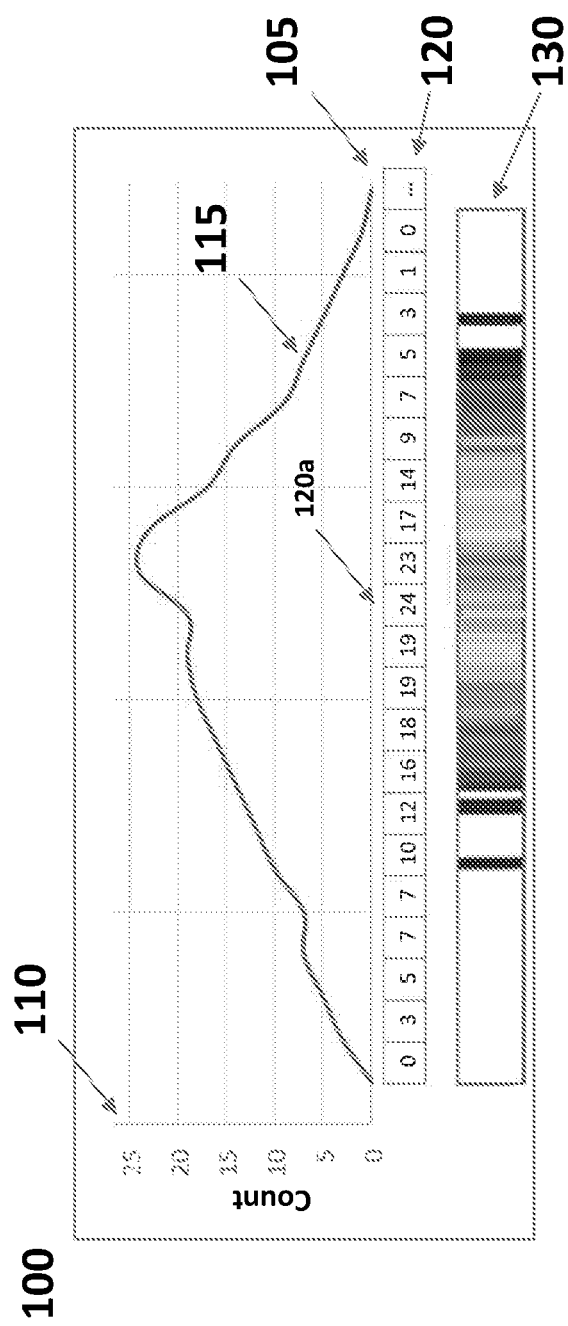
FIG. 1 depicts a display of an exemplary histogram of cytometric data.

Aspects of the present disclosure include methods of generating a representation of a histogram of cytometric data for displaying the histogram. In embodiments, methods include obtaining a histogram of cytometric data for a sample, wherein the cytometric data comprises measurements from particles irradiated in the sample flowing in a flow stream, generating the representation of the histogram by encoding the histogram, the encoding comprising: assigning a color to each histogram value in the representation of the histogram, and duplicating each color corresponding to each histogram value in the representation of the histogram a predetermined number of times, and using the representation of the histogram for displaying the histogram. In other instances, methods include displaying the histogram on a display device. In still other instances, methods include assigning colors to a plurality of histogram values substantially concurrently, such as, in some cases, using a plurality of parallel processing units, for example, a graphics processing unit. Where desired, methods also include adjusting a gain setting of a channel of a detector, for example, to prevent saturation of the channel. Systems for practicing the subject methods are also provided. Non-transitory computer readable storage mediums are also described.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for generating a representation of a histogram for displaying the histogram. In further describing embodiments of the disclosure, methods for displaying the histogram on a display device, assigning different display colors to histogram bins, assigning colors to a plurality of histogram values substantially concurrently, using parallel processing units, such as, for example, a graphics processing unit, to assign colors to a plurality of histogram values, interfacing with graphics processing units and generating representations of a plurality of histograms for displaying the histograms are first described in greater detail. Next, systems to practice the subject methods are described. Non-transitory computer readable storage mediums are also described.

Methods for Processing and Displaying Multi-Channel Spectral Histograms

Aspects of the present disclosure include methods for generating a representation of a histogram for displaying the histogram. In particular, the present disclosure includes methods for obtaining a histogram of cytometric data for a sample, wherein the cytometric data comprises measurements from particles irradiated in the sample flowing in a flow stream, generating the representation of the histogram by encoding the histogram, the encoding comprising: assigning a color to each histogram value in the representation of the histogram, and duplicating each color corresponding to each histogram value in the representation of the histogram a predetermined number of times, and using the representation of the histogram for displaying the histogram. In some cases, the efficiency of displaying a histogram may be improved by generating the representation of the histogram and using it for displaying the histogram such that a greater number of iterations of the histogram, each updated to reflect new or additional cytometric data, can be displayed more rapidly and/or in real time, or such that multiple histograms can be displayed simultaneously. In addition, the efficiency of displaying a histogram may be improved by generating the representation of the histogram and using it for displaying the histogram such that fewer computing resources, such as processor operations or data usage or memory accesses, such as high-latency memory accesses, may be reduced. When used in connection with flow cytometrically analyzing a sample, the subject methods can improve the ability to configure a particle analysis system as well as the analysis of the collected data.

Cytometric Data

In practicing the subject methods, cytometric data for a sample is obtained. The cytometric data comprises measurements from particles irradiated in the sample flowing in a flow stream. For example, cytometric data may comprise measurements of light detected when the sample is irradiated with a light source and light from the sample is detected with a light detection system having one or more photodetectors. In embodiments, such measurements of light may comprise measurements of light intensity. As described in detail below, in some embodiments, the cytometric data may comprise measurements of one or more of: excitation light that is scattered by the particles along a mostly forward direction, excitation light that is scattered by the particles along a mostly sideways direction, and light emitted from fluorescent molecules or fluorescent dyes used to label the particles in one or more ranges of frequencies. In embodiments of the present invention, obtaining a histogram of cytometric data for a sample comprises producing the histogram of data measurements from flow cytometrically analyzing the sample.

In some examples, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In some embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to cytometric data for samples obtained from human subjects of both genders and at any stage of development (i.e., neonates, infant, juvenile, adolescent, adult), where in certain embodiments the human subject is a juvenile, adolescent or adult. While the present invention may be applied to cytometric data for samples from a human subject, it is to be understood that the methods may also be carried-out on cytometric data for samples from other animal subjects (that is, in "non-human subjects") such as, but not limited to, birds, mice, rats, dogs, cats, livestock and horses.

In embodiments, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, a multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

The sample may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be a plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as microseconds or more, such as 30 microseconds or more and including 60 microseconds or more. For example, methods may include irradiating the sample with the light source (e.g., laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to microseconds. In embodiments where the sample is sequentially irradiated with two or more light sources, the duration the sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by microseconds or more, such as by 15 microseconds or more, such as by microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In certain embodiments, methods include irradiating the sample with two or more beams of frequency shifted light. A light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by microseconds or more, such as by 15 microseconds or more, such as by microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, flow cytometry systems of the invention are configured for imaging particles in a flow stream by fluorescence imaging using radiofrequency tagged emission (FIRE), such as those described in Diebold, et al., *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324, 019; 10,408,758; 10,451,538; 10,620,111; and U.S. Patent Publication Nos. 2017/0133857; 2017/0328826; 2017/ 0350803; 2018/0275042; 2019/0376895 and 2019/0376894 the disclosures of which are herein incorporated by reference.

As discussed above, in embodiments light from the irradiated sample is conveyed to a light detection system as described in greater detail below and measured by the plurality of photodetectors. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of fluorophores. In some embodiments, methods include measuring collected light across the entire fluorescence spectrum of each fluorophore in the sample.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

Histogram of Cytometric Data

In embodiments, a histogram of cytometric data for a sample is obtained. By histogram of cytometric data, it is meant any convenient representation of the cytometric data in a histogram format, where the histogram is configured in any convenient way (i.e., with any convenient number of histogram bins and any convenient set of measurements or measurement ranges associated with each bin). In some cases, the histogram of cytometric data may comprise cytometric data from a single channel of a single detector. In embodiments, the histogram comprises a plurality of bins, and histogram values are associated with the histogram bins. Histograms of interest may comprise two or more bins, ten or more bins, 50 or more bins, 100 or more bins, 256 or more bins or 1,000 or more bins. The bins of the histogram may correspond to ranges of measurements from, for example, a channel of the detector, and the value in a particular histogram bin may correspond to the number of measurements from particles irradiated in the sample, that fall within the range of measurement values corresponding to such particular histogram bin. In other embodiments, the measurements are light intensity measurements, such that the bins of the histogram may correspond to ranges of light intensity measurements. In other embodiments, the histogram is a spectral intensity histogram.

FIG. 1 depicts a display 100 of an exemplary histogram 120 of cytometric data for a sample according to the present invention. Histogram 120 is also represented as a two dimensional plot 115 on an x axis 105 and y axis 110. Histogram 120 is alternatively represented as a one-dimensional array 120 of histogram bins, each comprising a histogram value, as well as a color bar 130 where different colors correspond to each histogram value.

X-axis 105 represents different data measurements of the cytometric data. In instances of the present invention, the x-axis may reflect the cytometric data and therefore represent different ranges of measurements. For example, the x-axis (and the cytometric data) may represent light measurements from particles irradiated in the sample, such as measurements of light intensity. In some embodiments, the x-axis (and the cytometric data) represent one or more of forward scatter light (i.e., excitation light that is scattered by the particles along a mostly forward direction), side scatter light (i.e., excitation light that is scattered by the particles along a mostly sideways direction) and fluorescent light (i.e., light emitted from fluorescent molecules or fluorescent dyes used to label the particles in one or more ranges of frequencies). The x-axis depicted in display 100 may be divided into discrete ranges of measurement values, each range being associated with a histogram bin.

The y-axis 110 represents the values of each histogram bin, namely the number of measurements of particles in the sample that fall within each histogram bin. As noted above, FIG. 1 also illustrates a depiction of the histogram as a one-dimensional array 120. Array 120 is comprised of a plurality of bins, such as individual bin 120a, where each bin corresponds to one of the plurality of discrete ranges of measurement values on the x-axis 105. Each bin of histogram 120 includes an integer number that represent the number of measurements corresponding to particles in the sample included in the cytometric data that fall within the measurement range covered by each bin. Shown in FIG. 1, bin 120a includes the number "24" indicating that the cytometric data comprises 24 measurements, each corresponding to particles in the sample, that fall within the range of data values associated with bin 120a (such range of measurements is not shown in the figure).

An alternative display of histogram 120 is shown in color bar 130. Color bar 130 shows a set of colors associated with the corresponding histogram values, i.e., the value in each bin of histogram 120. Color bar 130 may be understood as "looking down" on histogram 120, where each color represents the histogram value of each bin. Color bar 130 is useful for readily summarizing in a visual form the characteristics of histogram 120. For example, a bin with a histogram value that is relatively high may have assigned to it a color that is relatively distinct from another bin with a histogram value that is relatively low in order to make these data visually distinct.

In some cases, the cytometric data may comprise data from a plurality of different channels of multiple detection devices. In such cases, the cytometric data may comprise several different histograms, where each histogram corresponds to one of a plurality of different channels of multiple detection devices. Because of this, there is a need for the display of the histogram according to the present invention, such as that shown in FIG. 1, to be scalable with respect to multiple additional histograms for display.

Figure 2:
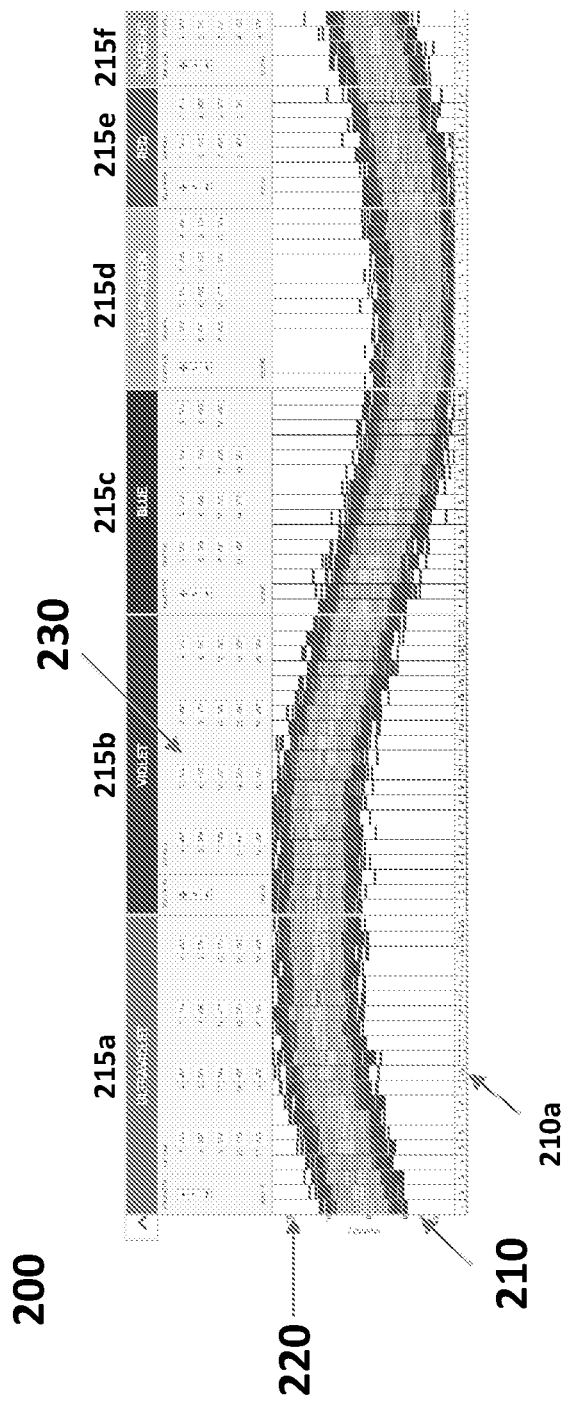
FIG. 2 depicts a display of an exemplary plurality of histograms of cytometric data according to certain embodiments.

FIG. 2 shows a display 200 of a plurality of histograms 210 according to the present invention. Each histogram of the plurality of histograms is a color bar like color bar 130 shown in FIG. 1. For example, histogram 210a is depicted as a color bar, in this case oriented vertically. Each color of histogram 210a corresponds to a histogram value, i.e., the value in each bin of histogram 210a. Different histogram values are assigned different colors so that display 200 of the histograms 210 readily presents salient features of the histograms in visual form. Shown in display 200 are visual depictions of cytometric data obtained from six different detectors 215a-f. The results of each of detectors 215a-f includes a plurality of different channels, including channel 210a belonging to detector 215a. The single histogram shown in channel 210a is analogous to the single histogram shown in color bar 130 of FIG. 1. In particular, histogram for channel 210a is divided into a plurality of vertical sections or components or bins, each corresponding to a range of measurements. That is, histogram bins are arranged vertically in the visual display of the histogram of channel 210a and are assigned different colors so that the characteristics of the histogram—in particular, the histogram value for each histogram bin—of channel 210a can be visually distinguished from each other. Vertical axis 220 of histograms 210 indicates different intensity values, such as intensity of light measured at each of the different channels of the cytometric data depicted in histograms 210. That is, each bin of histogram 210a corresponds to a range of light intensity measurements such that bins closer to the top of vertical axis 220 of the histogram 210a correspond to greater intensity measurements than bins closer to the bottom of vertical axis 220 of the histogram 210a. While light intensity and a particular orientation of histograms 210 are shown in FIG. 2, it will be appreciated that measurements of any relevant parameter of cytometric data and different orientations of display of histograms may be employed in a similar manner.

Also seen in FIG. 2 are controls 230 for adjusting channel gain settings in, for example, a particle analyzer used to generate the cytometric data represented by histograms 210. Adjusting a channel gain setting will have the effect of shifting the histogram up or down along vertical axis 220. In embodiments, display of histograms 210 and controls 230 find use in adjusting gain settings to find an optimal response of detector channels without saturating any channel.

Representation of Histogram

Methods according to the present invention include "generating the representation of the histogram by encoding the histogram." By "representation of the histogram" generated by encoding the histogram, it is meant a representation of a histogram generated by isolating salient aspects of the histogram, such as the number of bins in the histogram, the range of measurements associated with each bin of the histogram and the number of data points corresponding to each histogram bin, and specifying such aspects of the histogram in a form that readily facilitates the display of the histogram using a convenient format. That is, for example, the histogram of cytometric data may be a one dimensional array, meaning an ordered, contiguous list of data elements, where each element of the array corresponds to a histogram bin and comprises an integer number corresponding to the number of data points associated with the range of measurements represented by the bin. In instances, the "representation of the histogram" generated by encoding such a histogram, comprises encoding the histogram in a form that readily facilitates the display of the histogram. For example, in some embodiments, the representation of the histogram is generated by encoding the histogram as an array. Such array may comprise any convenient number of dimensions, such as a one-dimensional array, a two-dimensional array or a three-dimensional array or a higher dimensional array. Any convenient number of elements may comprise the number of entries in each dimension of the array. In some cases, where the longitudinal axis of the representation of the array corresponds to histogram bins, the number of elements of the array representation of the histogram may be 16 or more elements, 64 or more elements, 256 or more elements or 1024 or more elements. In some cases, the representation of the array comprises a two-dimensional array, and each element of the array corresponds to a display color and each display color corresponds to a number that is the number of data points (i.e., measurements of particles in a sample reflected in the cytometric data) associated with the range of measurements of a histogram bin. In embodiments where the representation of the histogram comprises an array, such as a two-dimensional array, within such two-dimensional array, the lateral array axis may represent different histogram bins and the longitudinal array axis may be present to laterally "stretch" the histogram to a degree that is meaningful for display of the histogram. That is, the lateral axis may be present so that the display of the histogram is depicts of a histogram with sufficient width that the display is readily understood by users. In such an exemplary two-dimensional array, each lateral element is merely a duplicate of a neighboring lateral element. In such embodiments, duplicating each color corresponding to each histogram value in the representation of the histogram a predetermined number of times may comprise duplicating elements of the array along a lateral axis of the array, for example, copying the encoding of the color assigned to a histogram bin in the representation of the histogram along a lateral axis.

According to the present invention, the representation of the histogram, as described above, is generated by assigning a color to each histogram value in the representation of the histogram and then duplicating each color corresponding to each histogram value in the representation of the histogram a predetermined number of times. By "assigning a color to each histogram value in the representation of the histogram," it is meant converting the number representing the histogram value into an encoding of a display color. By encoding of a display color, it is meant an encoding used by, for example, a display device or a controller for a display device, such as firmware device drivers, for example, to display one or more pixels of a certain color. In embodiments, assigning a color to each histogram value in the representation of the histogram may comprise assigning an encoding of a display color to elements of the array along a longitudinal axis of the representation of the histogram. The term "duplication" in the context of duplicating each color in the representation of the histogram is used in its conventional sense meaning to copy. In this case, encodings of colors that correspond to histogram values are copied a predetermined number of times, in order to "stretch" the representation of the histogram in the lateral direction to be reflect the width of the image of the histogram that is ultimately displayed. Encodings of colors in the representation of the histogram can be duplicated any convenient or desirable number of times. For example, the predetermined number, and thus the number of times encodings of color are duplicated in the representation of the histogram, can be 1 or more times, 10 or more times, 20 or more times, 50 or more times, 100 or more times, or 1,000 or more times. Upon duplicating each color corresponding to each histogram value in the representation of the histogram, the representation of the histogram consists of a series of "slices" or partitions, each encoding a color, where each slice or partition corresponds to a histogram value and the width of each slice corresponds to the predetermined number of times histogram colors are duplicated.

In embodiments, methods according to the present invention may further comprise determining the maximum value in the bins of the histogram, and using the maximum value to determine a scale factor for assigning colors to histogram values. By maximum value in the bins of the histogram, it is meant that the histogram is scanned, or iterated through, to find the largest value, i.e., the bin with the highest number of measurements of the cytometric data associated with it. A scale factor may be determined based on the ratio of the maximum value in the histogram bins to the number of display colors available. In such embodiments, assigning a color to a histogram value in the representation of the histogram comprises: using the scale factor to scale the histogram value to produce a scaled histogram value, and assigning a color corresponding to the histogram value based on the scaled histogram value. That is, scaling the histogram value results in the scaled histogram value corresponding to a color encoding. The number of distinct colors available for histogram bins is equal to the number of scaled histogram values, and the same histogram value always corresponds to the same scaled histogram value. Scaling histogram values may take the form of shifting a binary representation of a histogram value one or more bits to the right. Methods may further comprise obtaining a color palette comprising available colors for the representation of the histogram and using the scaled histogram value to access the color palette to determine the color corresponding to the histogram value. A color palette may comprise a list of available display colors. For example, in some embodiments the color palette is an array of different colors, and using the scaled histogram value to access the color palette comprises using the scaled histogram value to index into the color palette array from a base or zeroth position. By an array of different colors, it is meant a contiguous list, such as a one-dimensional array or contiguous list, comprised of encodings of display colors. By indexing into the color palette array, it is meant, for example, accessing the scaled histogram value number of entries into the color palette. The color palette may contain any convenient number of colors corresponding to the number of colors to be displayed, such as, 8 or more colors, 32 or more colors, 256 or more colors, 1,024 or more colors, 16,384 or more colors, 65,536 or more colors or 16,777,216 or more colors. For example, in some cases, the number of display colors may correspond to the number of colors that a display device of interest is capable of displaying, or in cases, the number of apparent colors that the display device is capable of apparently displaying. That is, the number of colors and thus the number of color encodings may correspond to, for example, the number of colors a monitor is capable of displaying or the number of colors a monitor is capable of displaying in conjunction with alternative mechanisms for displaying a wider variety of colors, such as by employing, for example, a frame rate control technique. In embodiments, a number of bits may be allotted to encode each color in the histogram representation. The number of bits used to encode colors in the histogram representation may be any convenient number of bits, such as three or more bits, five or more bits, eight or more bits, ten or more bits, 16 or more bits, 24 or more bits or 32 or more bits.

Certain embodiments follow a specified order of operations for generating a representation of the histogram in order to achieve greater efficiency and speed. For example, the method according to the present invention achieves greater efficiency in generating a representation of a histogram by first assigning a color to each histogram value in the representation of the histogram, prior to duplicating each color corresponding to each histogram value in the representation of the histogram a predetermined number of times. Efficiency in generating a representation of the histogram and using such representation to more efficiently render a display of the histogram is useful for increasing responsiveness of a histogram display, in particular when numerous histograms are being displayed or when there is a need to update the display of histograms at high speed or in real time. Examples of such specified order of operations include, in embodiments, assigning a color to each histogram value in the representation of the histogram by assigning an encoding of a display color to no more than a single position, such as an array element, at each longitudinal position of the representation of the histogram, such as an array. In such embodiments, the operation of translating a histogram value into an encoding of a color, such as by accessing a color palette, would occur only a single time for each histogram bin. That is, only one "look up" of the color corresponding to a histogram bin would be required for each row of the representation of the histogram. In other embodiments, duplicating each color corresponding to each histogram value in the representation of the histogram comprises duplicating elements of the representation of the histogram along a lateral axis of the representation of the histogram.

As described above, the representation of the histogram may be such that it is convenient to display the histogram based on such representation. For example, in embodiments of the present invention in which the representation of the histogram is an array, each element of the array may correspond to a pixel in the ultimate display of the histogram. That is, there may be a one-to-one correspondence between each element of the array representation of the histogram and each pixel of a display for displaying the histogram. In addition, the orientation of the array may further correspond to the orientation of the display of the histogram. For example, in embodiments of the present invention in which the representation of the histogram is an array, the elements of the array along a longitudinal axis correspond to pixels of a longitudinal axis in the display of the histogram, and the elements of the array along a lateral axis correspond to pixels of a lateral axis in the display of the histogram.

Histogram Display

Methods according to the present invention include using the representation of the histogram for displaying the histogram. Any convenient display of the histogram may be employed. The representation of the histogram may reflect aspects or constraints of the display of the histogram, such as, for example, the number of pixels allotted to the histogram in the display or the number of different colors available for displaying the histogram. In some embodiments, the representation of the histogram is used for displaying the histogram, for example, displaying a histogram on a display device, such as a screen or a monitor or a liquid crystal display (LCD) or a cathode ray tube, or a plasma screen or any other convenient output display apparatus.

In some cases, the representation of the histogram according to the present invention corresponds to aspects of how the histogram is displayed. For example, in embodiments, the predetermined number is the number of pixels displayed in a lateral direction of the displayed histogram. In such embodiments, when each color is duplicated a predetermined number of times in the representation of the histogram, each pixel is duplicated a predetermined number of times in a lateral direction in order to laterally "stretch" the display of the histogram.

In other embodiments, the shape of the displayed histogram is rectangular, a longitudinal axis of the displayed histogram corresponds to histogram bins, and colors within the displayed histogram correspond to histogram values. In such embodiments, different colors in the displayed histogram correspond to different histogram values, as described above.

Parallel Processing

Methods according to the present invention of generating a representation of a histogram exhibit a high degree of parallelism. By high degree of parallelism, it is meant that methods according to the present invention of generating a representation of a histogram consists of a plurality of independent tasks. Since the tasks are independent, they can be performed concurrently or in parallel, thereby overlapping the latency of accomplishing each individual task. That is, methods according to the present invention of generating a representation of a histogram is a high parallelizable operation. Methods according to the present invention exploit this high degree of parallelism when generating representations of histograms to improve the efficiency of displaying histograms. In the context of embodiments of methods according to the present invention in a computer processor context, such improvements in efficiency may entail utilization of fewer computing resources, such as limited computing resources in a particle analyzer, increased performance, such as reduced latency in generating a representation of a histogram according to the present invention (and thus reduced latency to display the histogram). Reduced latency may arise from, for example, implementing independent operations simultaneously or reducing the number of long-latency operations such as memory accesses.

As described in detail above, methods according to the present invention comprise assigning a color to each histogram value in the representation of the histogram. In some embodiments of the present invention, colors are assigned to a plurality of histogram values substantially concurrently. That is, because each bin of the histogram of cytometric data is separate and independent from each other bin, the operation of assigning a color in the representation of the histogram for each bin is a parallelizable task and, as such, may be performed substantially concurrently. Such embodiments may further comprise using a plurality of parallel processing units to assign colors to a plurality of histogram values substantially concurrently. By parallel processing units, it is meant, for example, a microprocessor capable of executing multiple instruction streams simultaneously such as multiple execution threads concurrently, for example, a microprocessor with more than one central processing unit or a multiprocessor or a multicore microprocessor. In such embodiments, the plurality of parallel processing units may comprise a graphics processing unit. By graphics processing unit, it is meant any convenient graphics processor or microprocessor comprising a more parallel structure, such as a larger number of execution cores, than a general purpose processor, such that the graphics processing unit is configured to perform a plurality of operations in parallel. Graphics processing units of interest include graphics processing units with hundreds of processing units that work in parallel and exists on a graphics video card and may be programmed using an application programming interface (API), such as, for example, WebGl API, OpenGL API, DirectX Video Acceleration (DxVA) API, Mantle, Vulcan and the like.

Graphics processing units of interest may include commercially available graphics processing units, such as those commercially available from Nvidia, AMD, Intel, Qualcomm or ARM. In embodiments that utilize a graphics processing unit, the graphics processing unit may comprise over one hundred processing units, and each processing unit may be configured to substantially concurrently assign a color to a histogram value in the representation of the histogram. That is, the resources of the graphics processing unit, in particular, the multiple processing units, are utilized, in a parallel (i.e., substantially concurrent) manner, to assign a color to a histogram value in the representation of the histogram according to the present invention. In embodiments that utilize a graphics processing unit, the graphics processing unit is located on a graphics processing card. Being located on a graphics processing card means the graphics processing unit does not sit on a motherboard of a computing system, but instead on a peripheral card that communicates with a motherboard via a bus, such as a PCI interface. Graphics processing cards of interest may also interface directly with a display, such as a display device consisting of a monitor or the screen or the like.

In embodiments that utilize a graphics processing unit, the graphics processing unit may receive as input a one-dimensional array corresponding to the histogram. That is, the histogram of cytometric data for a sample, from which the representation of the histogram is generated by encoding the histogram, may be input to the graphics processing unit in the form of a data structure comprising a one dimensional array. For example, such array may be an array of integers, where each element corresponds to a histogram bin and consists of a histogram value. Each histogram value may represent the number of measurements in the cytometric data corresponding to a predetermined range of measurements, such as, for example, a range of measurements of light intensity within a particular channel of a light detector. The length of the array may vary as needed, based on the desired presentation of the histogram data and the number of bins in the histogram of the cytometric data. In embodiments that utilize a graphics processing unit, the graphics processing unit may output a one-dimensional array corresponding to the representation of the histogram. For example, the one-dimensional output array may consist of an array of encoded display colors, where the graphics processing unit was used to translate different histogram values into corresponding encodings of display colors. In some embodiments that utilize a graphics processing unit, duplicating each color corresponding to each histogram value in the representation of the histogram may not be performed by the graphics processing unit. That is, in some embodiments, for each histogram value in the histogram of cytometric data, the graphics processing unit assigns one color and does not perform, for example, a look up operation to assign a color more than one time for each histogram value. Such configuration holds true even if the ultimate representation of the histogram includes a lateral dimension, such as when the lateral dimension of the representation of the histogram is "stretched" to some degree for ease of viewing a display of the histogram. As described above, in some embodiments, duplicating each color in the representation of the histogram is not performed by the graphics processing unit, such as by not assigning a color for a single histogram value multiple times to accomplish duplicating the color in the representation of the histogram.

A Plurality of Histograms

As shown in FIG. 2 discussed above, the display of multiple histograms finds use when working with cytometric data comprising, for example, measurements from a plurality of channels of a plurality of detectors or otherwise having more than one different data set, where it is desirable to analyze each data set based on its own histogram. For each of the multiple histograms displayed, an individual representation of a histogram would be generated, according to any of the methods of generating a representation of a histogram for displaying the histogram, discussed herein. As such, methods according to the present invention may consist of generating representations of a plurality of histograms for displaying the histograms. Such methods may comprise: obtaining a plurality of histograms of cytometric data for a sample, generating the representations of the plurality of histograms according to any of the methods of generating a representation of a single histogram discussed herein, and using the representations of the plurality of histograms for displaying the plurality of histograms.

In embodiments of methods according to the present invention for generating representations of a plurality of histograms, each histogram of the plurality of histograms may comprise light measurements of the cytometric data obtained by each channel of a plurality of channels of one or more detectors. As described above, the cytometric data may comprise light measurement data, and with respect to multiple histograms, each may correspond to a different channel, such as the different histograms corresponding to different detector channels shown in FIG. 2. In order for a display of histograms to more readily permit a comparison of multiple histograms, such as histograms corresponding to different detector channels, in embodiments, each histogram of the plurality of histograms may include the same number of histogram bins. In other embodiments, corresponding histogram bins of each histogram of the plurality of histograms may have the same ranges of measurement values associated with them. When each histogram of the plurality of histograms includes the same number of histogram bins and/or, in instances, when each histogram bin of each of the plurality of histograms corresponds to a comparable range of measurements, then a display of the plurality of histograms facilitates more meaningful comparisons between different histograms of the plurality of histograms.

In embodiments of methods according to the present invention for generating representations of a plurality of histograms for displaying the histograms, using the representations of the plurality of histograms for displaying the plurality of histograms comprises using the representations of the plurality of histograms for displaying the plurality of histograms on a display device. Any convenient display device, as those discussed above, may be employed to display the plurality of histograms.

In some embodiments, the representations of the plurality of histograms comprise a two-dimensional array. By two-dimensional array, it is meant an arrangement of data values, in this case histogram values, where each value has associated with it a column number and a row number, each corresponding to one of the two dimensions of the array. In such embodiments, a first dimension of the two-dimensional array may correspond to histogram bins and a second dimension of the two-dimensional array may correspond to the histograms of the plurality of histograms. That is, individual histograms of the plurality of histograms may be indexed along a second dimension of the two dimensional array and different bins of the different histograms may be indexed along a first dimension of the two dimensional array.

As discussed above in the context of a single representation of a histogram of cytometric data, generating a representation of a single histogram exhibits a high degree of parallelism. Generating representations of more than one histogram similarly exhibits a high degree of parallelism. As such, in embodiments of methods according to the present invention for generating representations of a plurality of histograms, the representations of more than one histogram are generated substantially concurrently. By generated substantially concurrently, it is meant that the latency of a single operation of generating a single representation of a histogram is overlapped with the latency of generating one or more other representations of histograms.

Measurement Channel Saturation Display

Some embodiments of methods according to the present invention further comprise determining whether a detector channel is saturated. By detector channel, it is meant a channel of a detector, such as detectors described herein, used to collect measurements from particles irradiated in the sample. In embodiments, when a detector channel is saturated, the detector channel is no longer capable of meaningfully distinguishing between different measurements. In some cases, detector channel saturation is exhibited by a substantial number of measurements falling outside an established range of expected measurements for a histogram. For example, ranges of measurement values (e.g., measurements of light, such as fluorescent light, from irradiated particles flowing in a flow stream) for histogram bins may be established using measurement values corresponding to a detector channel known not to be saturated. Other means may also be employed to establish histogram measurement ranges. When, upon further use of the detector channel, subsequent measurement values for particles of the sample fall outside the established measurement ranges, the detector channel may be saturated. In some cases, measurement values falling outside an established histogram range may indicate measurement values exceed a maximum discernable measurement value of the detector channel or, in other cases, do not rise to the level of a minimum discernable measurement value of the detector channel. Adjustments to a detector channel gain settings, such as increasing or decreasing gain, may in some cases resolve saturation.

In embodiments, determining whether a detector channel is saturated comprises determining whether a percentage over-saturated of a detector channel is greater than a predetermined threshold. By "percentage over-saturated," it is meant a ratio of the number of all the particle measurements that fall outside the established ranges of histogram bins to the total number of all particle measurements. That is, qualitatively, in some cases, the "percentage over-saturated" refers to the proportion of measurements in the cytometric data that fall outside the established range of the channel detector. In such cases, the measurements that fall outside the established range cannot be displayed on a histogram that reflects the standard ranges of histogram bins for the detector channel. In some cases, the percentage over-saturated reflects a degree of saturation, such that a higher percentage indicates a greater degree of saturation. The predetermined threshold for saturation may be any convenient percentage, such as, for example, 1% or more, 2% or more, 5% or more, 10% or more, 25% or more, or 50% or more or 75% or more. In some cases, the predetermined threshold may be configured to be the same for each individual histogram or each sample, such as a default value. In other cases, the predetermined threshold may differ for each individual histogram or each sample.

Certain embodiments of methods according to the present invention further comprise displaying a saturation user interface corresponding to a saturated detector channel. That is, a display of the histogram may be emphasized, or additional text or icons may be displayed to notify to the user that the detector channel corresponding to the histogram is saturated. In some cases, a saturation user interface further comprises displaying the percentage over-saturated for the detector channel and corresponding histogram, such as, for example, additional text in the display identifying the detector channel and the percentage over-saturation. In other case, the histogram corresponding to the saturated detector channel is blown up—i.e., the display is increased in size—as compared with the display of a histogram corresponding to a non-saturated detector channel. A saturation user interface may be displayed as soon as it is determined that a detector channel is saturated. In some embodiments, the saturation user interface comprises a prompt with instructions for adjusting a setting of the saturated detector channel, such as, for example, a prompt with instructions for adjusting the detector channel gain setting downwards by 5%, or the like.

In embodiments in which a plurality of histograms is displayed, the display of the plurality of histograms may further comprise displaying a saturation user interface corresponding to a saturated detector channel. That is, the histogram corresponding to a saturated detector channel may be emphasized in the display of a plurality of histograms by, for example, increasing the relative size of the display of the histogram corresponding to the saturated detector channel or displaying icons on or near the histogram, highlighting the display of the histogram, displaying a border around the histogram, causing the display to blink or otherwise cause the display to change in a manner that emphasizes the histogram corresponding to the saturated detector channel. The saturation user interface may include text indicating which detector channel is saturated and instructing the user to adjust corresponding settings. In some embodiments, the saturation user interface comprises displaying the percentage over-saturated of the saturated detector channel. In other embodiments, the saturation user interface comprises a prompt to adjust a setting of the saturated detector channel. For example, the saturation user interface may comprise a prompt with instructions for adjusting the gain setting of the saturated detector channel downwards by 5%, or the like.

Real Time Processing and Using the Display for Adjusting Settings

In embodiments of methods according to the present invention, generating the representation of the histogram, or generating the representations of each histogram of the plurality of histograms, as the case may be, is performed substantially in real time. By substantially in real time, it is meant that that methods according to the present invention may be configured to generate representations in accordance with certain time constraints, including time constraints that are sufficiently short that a display of a histogram can be updated or otherwise re-displayed continuously with updated or new histograms of cytometric data.

In other embodiments of methods according to the present invention, the method may further comprise adjusting settings for collecting the cytometric data based on the display of one or more histograms, as the case may be. Adjusting settings for collecting cytometric data may comprise, for example, adjusting settings of a particle analyzer or flow-type particle detection system used to collect cytometric data. In some cases, adjusting settings comprises adjusting one or more gain settings of a channel of a detector for collecting the cytometric data. In such cases, adjusting a gain setting of a channel of a detector for collecting the cytometric data may comprise preventing saturation of the channel of the detector. By channel or detector saturation, it is meant in some cases that the channel or detector registers a substantial number of its measurements at or nearly at a maximum measurement range of the channel or detector, such that the channel or the detector when saturated is not capable of meaningfully distinguishing between different measurements.

Systems for Processing and Displaying Multi-Channel Spectral Histograms

As summarized above, aspects of the present disclosure include a system that is configured processing and displaying multi-channel spectral histograms, such as histograms of cytometric data of comprising measurements from particles of a sample. In particular, the present disclosure includes systems configured to generate a representation of a histogram for displaying the histogram. As described above, the term representation of a histogram refers to an encoding of histogram data that can be used to display histogram data. In particular, a representation of the histogram refers to a representation that can be efficiently generated such that it can be used to display a plurality of histograms while minimizing processing and display time as well as memory and processing resources needed such that the display of one or more histograms can be updated substantially in real time. Systems according to certain embodiments include a general purpose processor comprising memory operably coupled to the general purpose processor, wherein the memory comprises instructions stored thereon, which, when executed by the general purpose processor, cause the general purpose processor to: obtain a histogram of cytometric data for a sample, wherein the cytometric data comprises measurements from particles irradiated in the sample flowing in a flow stream; transmit the histogram to a plurality of parallel processing units; receive a representation of the histogram from the plurality of parallel processing units, wherein the representation comprises encodings of colors corresponding to each histogram value; duplicate the encodings of colors corresponding to the histogram values in the representation of the histogram a predetermined number of times; and use the representation of the histogram for displaying the histogram on an output device; and a plurality of parallel processing units, operably connected to the general purpose processor and comprising memory operably coupled to the plurality of parallel processing units, wherein the memory comprises instructions stored thereon, which, when executed by the plurality of parallel processing units, cause the plurality of parallel processing units to: receive the histogram from the general purpose processor; generate the representation of the histogram by encoding the histogram, the encoding comprising assigning an encoding of a color to each histogram value in the representation of the histogram; and transmit the representation of the histogram to the general purpose processor. Histograms of cytometric data for a sample are described above. Systems and devices for use in collecting measurements that comprise cytometric data are discussed below.

Light Source

In embodiments, with respect to the cytometric data, particles in the sample flowing in a flow stream may be irradiated using a light source. The light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm. In certain embodiments, the light source is a laser. In some instances, the subject systems include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

In other cases, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, a multi-LED integrated light source. In some instances, the non-laser light source is a stabilized fiber-coupled broadband light source, white light source, among other light sources or any combination thereof.

The light source may be positioned any suitable distance from the sample flowing in a flow stream (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate the sample continuously or in discrete intervals. In some instances, systems include a light source that is configured to irradiate the sample continuously, such as with a continuous wave laser that continuously irradiates the flow stream at the interrogation point in a flow cytometer. In other instances, systems of interest may irradiate the sample using a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer controlled beam stops for blocking and exposing the sample to the light source.

In some cases, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof; a semiconductor diode laser, optically pumped semiconductor laser (OPSL), or a frequency doubled or frequency tripled implementation of any of the above mentioned lasers.

In certain instances, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser, such as described above.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In instances, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to about 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory that may include instructions to produce 100 or more angularly deflected laser beams with the same intensities. In other embodiments, the memory may include instructions to produce two or more angularly deflected laser beams with different intensities, such as 3 or more, such as 4 or more, such as 5 or more, such as 10 or more, such as 25 or more, such as 50 or more and including memory that may include instructions to produce 100 or more angularly deflected laser beams with different intensities.

In certain cases, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other cases, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other cases, the controller has a processor having memory operably coupled to the processor such that the memory includes instructions stored thereon, which when executed by the processor, cause the processor to produce an output laser beam having an intensity profile with a Gaussian distribution along the horizontal axis. In still other cases, the controller has a processor having memory operably coupled to the processor such that the memory includes instructions stored thereon, which when executed by the processor, cause the processor to produce an output laser beam having a top hat intensity profile along the horizontal axis.

In instances, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some instances, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Detectors

In embodiments, cytometric data may consist of measurements of light detected from particles irradiated in the sample flowing in a flow stream. Light detection systems may be employed to measure such light from particles of the sample. Light detection systems may have one or more photodetectors. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In instances, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain cases, the photodetector array has a rectangular-shaped active surface.

Each photodetector (e.g., photodiode) in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm, where the surface area of each photodetector (e.g., photodiode) in the array ranges from 25 to $\mu m^2$ to 10000 $\mu m^2$, such as from 50 to $\mu m^2$ to 9000 $\mu m^2$, such as from 75 to $\mu m^2$ to 8000 $\mu m^2$, such as from 100 to $\mu m^2$ to 7000 $\mu m^2$, such as from 150 to $\mu m^2$ to 6000 $\mu m^2$ and including from 200 to $\mu m^2$ to 5000 $\mu m^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm$^2$ to 10000 mm$^2$, such as from 0.5 mm$^2$ to 5000 mm$^2$, such as from 1 mm$^2$ to 1000 mm$^2$, such as from 5 mm$^2$ to 500 mm$^2$, and including from 10 mm$^2$ to 100 mm$^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, photodetectors may be configured to be paired with specific fluorophores, such as those used with the sample in a fluorescence assay. In some embodiments, photodetectors are configured to measure collected light across the entire fluorescence spectrum of each fluorophore in the sample.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Configuration of Processors and Memory

Systems according to the present disclosure include a processor having memory operably coupled to the processor where the memory includes instructions stored thereon which when executed by the processor cause the processor to obtain a histogram of cytometric data for a sample, wherein the cytometric data comprises measurements from particles irradiated in the sample flowing in a flow stream, transmit the histogram to a plurality of parallel processing units, receive a representation of the histogram from the plurality of parallel processing units, wherein the representation comprises encodings of colors corresponding to each histogram value, duplicate the encodings of colors corresponding to the histogram values in the representation of the histogram a predetermined number of times, and use the representation of the histogram for displaying the histogram on an output device.

In instances, histogram of cytometric data may be obtained by the general purpose processor by any convenient input technique, such as via a wired or wireless network connection, shared memory, a bus or similar communication protocol with a source of cytometric data, such as an ethernet connection or a Universal Serial Bus (USB) connection, portable memory devices or the like. The general purpose processor may be configured to preprocess histogram of cytometric data so that it histogram of cytometric data is arranged in memory in a form that is convenient for subsequent processing, such as processing by parallel processing units. Such arrangement may be any convenient arrangement capable of optimizing further processing by parallel processing units, such as, for example, a contiguous array of memory, such as a contiguous list of memory where each histogram bin is accessed by means of an offset from a base memory address that corresponds to the beginning, or zeroth position, of the array. By transmitting the histogram to a plurality of parallel processing units, it is meant any convenient means of initiating further processing on the histogram of cytometric data by a plurality of parallel processing units. Such transmitting may consist of a function call from the general purpose processor to the plurality of parallel processing units communicating a location in memory corresponding to the histogram, such as the base address in memory of the histogram, where such function has the effect of initiating further processing by plurality of parallel processing units. By general purpose processor, it is meant any convenient processor that is optimized for general purpose workloads. While such processor may consist of multiple cores or multiple processors, typically, it would be expected to include fewer such cores than the plurality of parallel processing units according to the present invention.

Similarly, by receiving a representation of the histogram from the plurality of parallel processing units, it is meant any convenient means of signally that the plurality of parallel processing units has completed generating a representation of a histogram consisting of encoding a collection of display colors corresponding to each histogram value. As described in detail above, generating encodings for histogram values of the histogram of cytometric data is a task that exhibits a high degree of parallelism and therefore is performed on parallel processing units to reduce overall latency and memory usage requirements. By plurality of parallel processing units, it is meant, for example, a graphics processor or similar processor that is optimized for performing a large number of parallel operations concurrently, for example, a multi-core processor, or even a series of processors integrated into the memory to facilitate longer latency memory operations. As described above, any convenient graphics processor may be employed, such commercially available graphics processors available from Nvidia, AMD, Intel, Qualcomm or ARM. Receiving a representation of the histogram from the plurality of parallel processing units may take the form of a function call transmitting the representation of the histogram to the processor, for example, by transmitting a base address of the representation of the histogram to the processor for further processing by the processor. By generating the representation of the histogram by encoding the histogram, the encoding comprising assigning an encoding of a color to each histogram value in the representation of the histogram, it is meant creating a representation in memory of the representation of the histogram of cytometric data consisting of encodings of display colors, each corresponding to a histogram value. Any convenient technique can be employed to generate such representation, such as, for example, scaling each histogram value based on the maximum histogram value in the histogram and number of display colors available, and using such scaled value to access a look up table consisting of encodings of available display colors.

By duplicate the encodings of colors corresponding to the histogram values in the representation of the histogram a predetermined number of times, it is mean copying encodings of colors in the representation of the histogram a predetermined number of times, typically corresponding to the number of pixels in the width of the display of the histogram. Such copying operation can be performed using any convenient technique that minimizes longer latency operations such as memory accesses. That is, such copying may be performed by loading the value to be copied a single time from memory and using the value obtained from that single load instruction to duplicate the color in the representation of the histogram a predetermined number of times. Duplicating the encodings of colors may be performed such that the resulting representation of the histogram is in a form that is convenient for use in displaying the histogram. For example, the representation of the histogram may be arranged contiguously in memory, such that the representation can be easily transmitted to a display device or otherwise used to display the histogram.

By use the representation of the histogram for displaying the histogram on an output device, it is meant any convenient way to transmit the representation of the histogram, consisting of encodings of colors of the histogram values that are duplicated a predetermined number of times, corresponding to "stretching" the histogram such that the histogram width is a desirable size for viewing a display of the histogram. By using the representation for displaying the histogram, it is meant that a function call may be made by the general purpose processor to an output device indicating that the output device should begin displaying the histogram and also transmitting the location in memory of the representation of the histogram.

In embodiments of systems according to the present disclosure, the cytometric data comprises light measurements from the particles irradiated in the sample. In such embodiments of systems, the light measurements may be measurements of light intensity. In embodiments of systems, the cytometric data comprises measurements of one or more of: excitation light that is scattered by the particles along a mostly forward direction, excitation light that is scattered by the particles along a mostly sideways direction, and light emitted from fluorescent molecules or fluorescent dyes used to label the particles in one or more ranges of frequencies.

In embodiments of systems according to the present disclosure, the histogram comprises a plurality of bins, and the histogram values are associated with the histogram bins. In such embodiments of systems, each histogram bin may correspond to a range of measurements from the particles irradiated in the sample. In such embodiments, the measurements may be light intensity measurements and/or the histogram may be a spectral intensity histogram.

Systems according to the present disclosure may further comprise a display device operably connected to the general purpose processor, wherein using the representation of the histogram to display the histogram on an output device comprises using the representation of the histogram to display the histogram on the display device. By display device, it is meant any convenient device for outputting an image of a histogram, such as a monitor, a liquid crystal display screen, a light emitting diode display, a plasma display, a cathode ray tube, electroluminescent display, a touchscreen or the like. The display device may be integrated with the general purpose processor via a wired or wireless connection, such as via a USB connection or a Bluetooth connection, for example. The operation of the display device may be under the control of software executed on the general purpose processor. The display device may consist of a controller for controlling the display device capable of communicating with the general purpose processor via, for example, shared memory addresses. In some embodiments of systems, the predetermined number is the number of pixels displayed in a lateral direction of the displayed histogram. That is, the representation of the histogram consists of each color having been duplicated a predetermined number of times, where such predetermined number corresponds to the width, in pixel count, of the display of the histogram. In such cases, the representation of the histogram may closely correspond to the display of the histogram such that the display of the histogram is optimized to reduce the latency of display. In embodiments of systems, the shape of the displayed histogram may be rectangular, wherein a longitudinal axis of the displayed histogram corresponds to histogram bins, and colors within the displayed histogram correspond to histogram values. In such embodiments, different colors in the displayed histogram may correspond to different histogram values. That is, different colors may be used to cue a viewer of the histogram to the value or the relative value of histogram bins, and thereby facilitate understanding and analysis of the underlying cytometric data.

In embodiments of the system, the representation of the histogram comprises an array. By array, it is meant, for example, a contiguous list of memory locations, such that array elements, i.e., histogram bins, can be accessed by offsets from the base of the array, i.e., the zeroth position of the array. In such embodiments of systems, assigning an encoding of a color to each histogram value in the representation of the histogram may comprise assigning an encoding of a display color to elements of the array along a longitudinal axis of the array. In such embodiments of systems, assigning an encoding of a color to each histogram value in the representation of the histogram may comprise assigning an encoding of a display color to no more than a single array element at each longitudinal position of the array. That is, the generation of the representation of the histogram according to the present invention may be optimized such that the relatively expensive operation of encoding a color for a histogram value occurs only once with respect to each histogram bin, notwithstanding that the ultimate display of the histogram includes a width that is greater than a single pixel. In some cases, the longitudinal axis of the array is 256 entries, meaning the histogram as well as the display of the histogram comprises enough space for 256 histogram bins. In other cases, duplicating each encoding of colors corresponding to the histogram values in the representation of the histogram comprises duplicating elements of the array along a lateral axis of the array. That is, the lateral axis of the array may correspond to the "width" of the array in the histogram display, such that each lateral position is a different histogram bin.

In embodiments of systems, each element of the array corresponds to an output device pixel in the display of the histogram. In some embodiments of systems, the elements of the array along a longitudinal axis correspond to output device pixels of a longitudinal axis in the display of the histogram.

In embodiments of systems according to the present invention, the general purpose processor is further configured to determine the maximum value in the bins of the histogram, and use the maximum value to determine a scale factor for assigning colors to histogram values. In such embodiments of systems, assigning an encoding of a color to a histogram value in the representation of the histogram comprises: using the scale factor to scale the histogram value to produce a scaled histogram value, and assigning a color corresponding to the histogram value based on the scaled histogram value. Further, in such embodiments of systems, the general purpose processor may be configured obtain a color palette comprising available colors for the histogram representation, and use the scaled histogram value to access the color palette to determine the color corresponding to the histogram value. By use the scaled histogram value, it is meant that, in some cases, the general purpose processor transmits or otherwise communicates information about scaled histogram values, such as a scale factor, to the plurality of parallel processing units for the parallel processing units to use such scale factor and information on the available colors to encode, such as by looking up, display colors associated with histogram values. In such cases, the color palette may be an array of different colors, and using the scaled histogram value to access the color palette comprises using the scaled histogram value to index into the color palette array. In some cases, the color palette comprises 256 colors. That is, there may be a total of 256 different display colors to encode different histogram values. In such cases, eight bits may be used to represent each color in the histogram representation since 256 different display colors can be represented with eight bits.

In embodiments of systems according to the present invention, the plurality of parallel processing units may be further configured to assign encodings of colors to a plurality of histogram values in the representation of the histogram substantially concurrently. By substantially concurrently, it is meant that more than one of the parallel processing units may be assigning encodings of colors to different histogram values at overlapping times, such that the parallel processing units may be operating substantially independently to assign colors in a way that enables the latency of assigning a particular color of a particular histogram value to be overlapped with assigning other colors to other histogram values. In some embodiments of systems, the plurality of parallel processing units comprises a graphics processing unit, meaning any microprocessor configured to use in performing graphics operations, such as those commercially described herein. In some cases, the graphics processing unit comprises over one hundred processing units, and each processing unit is configured to substantially concurrently assign an encoding of a color to a histogram value in the representation of the histogram. In such embodiments, the graphics processing unit may be located on a graphics processing card. By located on the graphics processing card, it is meant that the graphics processing unit is on a different card or circuit board than the general purpose processor. In other words, the graphics processing unit may be located on a board other than the motherboard.

In embodiments of systems, in connection with transmitting histogram data to a graphics processing unit, the graphics processing unit may receive as input a one-dimensional array corresponding to the histogram. In some embodiments, the graphics processing unit transmits as output a one-dimensional array corresponding to the representation of the histogram. In embodiments of systems, the system may be configured to generate the representation of the histogram for displaying the histogram substantially in real time. By real time, it is meant that the system is configured to generate a representation under time constraints, such that the latency of the system to perform such generation is within specified time bounds.

In other embodiments of systems according to the present invention, the system is configured to determine whether a detector channel is saturated. In some cases, the system is configured to determine whether a detector channel is saturated by determining whether a percentage over-saturated of a detector channel is greater than a predetermined threshold, wherein the percentage over-saturated of a detector channel comprises a ratio of the number of particle measurements that fall outside established histogram bins to the total number of particle measurements. By "percentage over-saturated," it is meant a ratio of the number of all the particle measurements that fall outside the established ranges of histogram bins to the total number of all particle measurements. The predetermined threshold may be any convenient percentage, such as, for example, 1% or more, 2% or more, 5% or more, 10% or more, 25% or more, or 50% or more or 75% or more. In other cases, the system is further configured to cause display of a saturation user interface corresponding to a saturated detector channel, where the saturation user interface may display the percentage over-saturated of the saturated detector channel. In still other cases, the saturation user interface may prompt a user to adjust a setting of the saturated detector channel.

Systems according to the present invention may be further configured to generate representations of a plurality of histograms of cytometric data. In particular, systems according to the present invention may be further configured such that the plurality of parallel processing units are configured to receive a plurality of histograms of the cytometric data from the general purpose processor, generate representations of the plurality of histograms by encoding the plurality of histograms, the encoding comprising assigning an encoding of a color to each histogram value in the representations of the plurality of histograms, and transmit the representations of the plurality of histograms to the general purpose processor, and the general purpose processor may be further configured to use the representation of the histogram for displaying the plurality of histograms on the output device. In such embodiments, each histogram of the plurality of histograms may comprise light measurements of the cytometric data obtained by each channel of a plurality of channels of one or more detectors. In such cases, each histogram of the plurality of histograms may include the same number of histogram bins. In such system embodiments, corresponding histogram bins of each histogram of the plurality of histograms may have the same ranges of measurement values associated with them. In some embodiments of systems, the representations of the plurality of histograms comprise a two-dimensional array. In such embodiments of systems, a first dimension of the two-dimensional array may correspond to histogram bins and a second dimension of the two-dimensional array may correspond to the histograms of the plurality of histograms. In some embodiments of systems, the parallel processing units are configured to generate representations of more than one histogram substantially concurrently, by which it is meant that the processing on parallel processing units corresponding to more than one histogram of the cytometric data occurs at the same time, such that the latency of one generating a representation of one histogram is overlapped with the latency of generating a representation of a separate histogram. Some embodiments of systems of the present invention are configured to generate representations of the plurality of histograms for displaying the plurality of histograms substantially in real time.

In certain embodiments of systems according to the present invention in which representations of a plurality of histograms are generated, the system is configured to cause display of a saturation user interface corresponding to a saturated detector channel. In such cases, the saturation user interface may comprise displaying the percentage oversaturated of the saturated detector channel. In other cases, the saturation user interface may comprise a prompt to adjust a setting of the saturated detector channel.

Particle Analyzers

Figure 3:
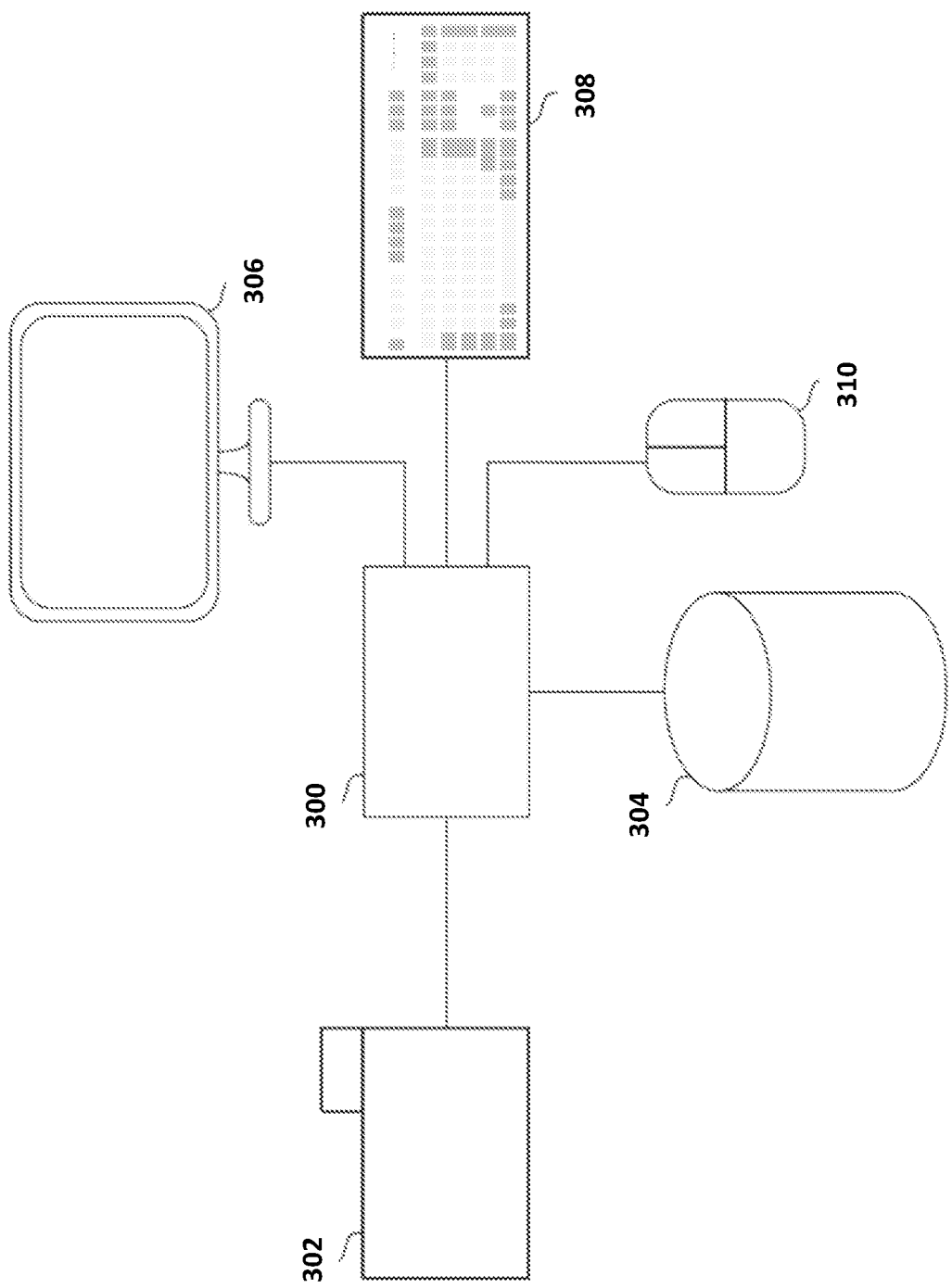
FIG. 3 depicts a functional block diagram for one example of a control system of a particle analyzer according to certain embodiments.

FIG. 3 shows a functional block diagram for one example of a particle analyzer or sorting control system, such as an analytics controller 300, for analyzing and displaying biological events. An analytics controller 300 can be configured to implement a variety of processes for controlling graphic display of biological events.

A particle analyzer or sorting system 302 can be configured to acquire biological event data. For example, a flow cytometer can generate flow cytometric event data. The particle analyzer 302 can be configured to provide biological event data to the analytics controller 300. A data communication channel can be included between the particle analyzer 302 and the analytics controller 300. The biological event data can be provided to the analytics controller 300 via the data communication channel.

The analytics controller 300 can be configured to receive biological event data from the particle analyzer 302. The biological event data received from the particle analyzer 302 can include flow cytometric event data. The analytics controller 300 can be configured to provide a graphical display including a display of one or more histograms of cytometric data or a first plot of biological event data to a display device 306. For example, analytics controller 100 300 can be configured to generate a representation of a histogram for use in displaying the histogram to display device 306. The analytics controller 300 can be further configured to render a region of interest as a gate around a population of biological event data shown by the display device 306, overlaid upon the first plot, for example. In some embodiments, the gate can be a logical combination of one or more graphical regions of interest drawn upon a single parameter histogram or bivariate plot. In some embodiments, the display can be used to display particle parameters. In some embodiments, the display can be used to display settings applicable to particle analyzer 302 in conjunction with histograms of cytometric data, for use in calibrating detectors of particle analyzer 302.

The analytics controller 300 can be further configured to display the biological event data on the display device 306 within the gate differently from other events in the biological event data outside of the gate. For example, the analytics controller 300 can be configured to render the color of biological event data contained within the gate to be distinct from the color of biological event data outside of the gate. The display device 306 can be implemented as a monitor, a tablet computer, a smartphone, or other electronic device configured to present graphical interfaces.

The analytics controller 300 can be configured to receive adjustments to configuration settings for the particle analyzer 302 from the first input device. Such adjustments to configuration settings, when received from the first input device to the analytics controller 300 can be used to update the settings of the particle analyzer. For example, in embodiments, gain settings for a channel detectors may be adjusted in order to avoid saturation of the channel detector.

In addition, the analytics controller 300 can be configured to receive a gate selection signal identifying the gate from a first input device. For example, the first input device can be implemented as a mouse 310. The mouse 310 can initiate a gate selection signal to the analytics controller 300 identifying the gate to be displayed on or manipulated via the display device 306 (e.g., by clicking on or in the desired gate when the cursor is positioned there). In some implementations, the first device can be implemented as the keyboard 308 or other means for providing an input signal to the analytics controller 300 such as a touchscreen, a stylus, an optical detector, or a voice recognition system. Some input devices can include multiple inputting functions. In such implementations, the inputting functions can each be considered an input device. For example, as shown in FIG. 3, the mouse 310 can include a right mouse button and a left mouse button, each of which can generate a triggering event.

The triggering event can cause the analytics controller 300 to alter the manner in which the data is displayed, which portions of the data is actually displayed on the display device 306, and/or provide input to further processing such as selection of a population of interest for particle sorting.

In some embodiments, the analytics controller 300 can be configured to detect when gate selection is initiated by the mouse 310. The analytics controller 300 can be further configured to automatically modify plot visualization to facilitate the gating process. The modification can be based on the specific distribution of biological event data received by the analytics controller 300.

The analytics controller 300 may be comprised of at least one general purpose processing unit as well as a plurality of parallel processing units. The analytics controller 300 can be connected to a storage device 304. When the analytics controller 300 comprises at least one general purpose processing unit as well as a plurality of parallel processing units, each of the general purpose processing unit as well as the plurality of processing units may each have access to and utilize storage device 304. The storage device 304 can be configured to receive and store biological event data from the analytics controller 300. The storage device 304 can also be configured to receive and store flow cytometric event data from the analytics controller 300. The storage device 304 can be further configured to allow retrieval of biological event data, such as flow cytometric event data, by the analytics controller 300. The storage device 304 can also be configured to store one or more histograms of cytometric data.

A display device 306 can be configured to receive display data from the analytics controller 300. The display data can comprise plots of biological event data and gates outlining sections of the plots. The display device 306 can be further configured to alter the information presented according to input received from the analytics controller 300 in conjunction with input from the particle analyzer 302, the storage device 304, the keyboard 308, and/or the mouse 310.

In some implementations the analytics controller 300 can generate a user interface to receive example events for sorting. For example, the user interface can include a control for receiving example events or example images. The example events or images or an example gate can be provided prior to collection of event data for a sample or based on an initial set of events for a portion of the sample.

Figure 4:
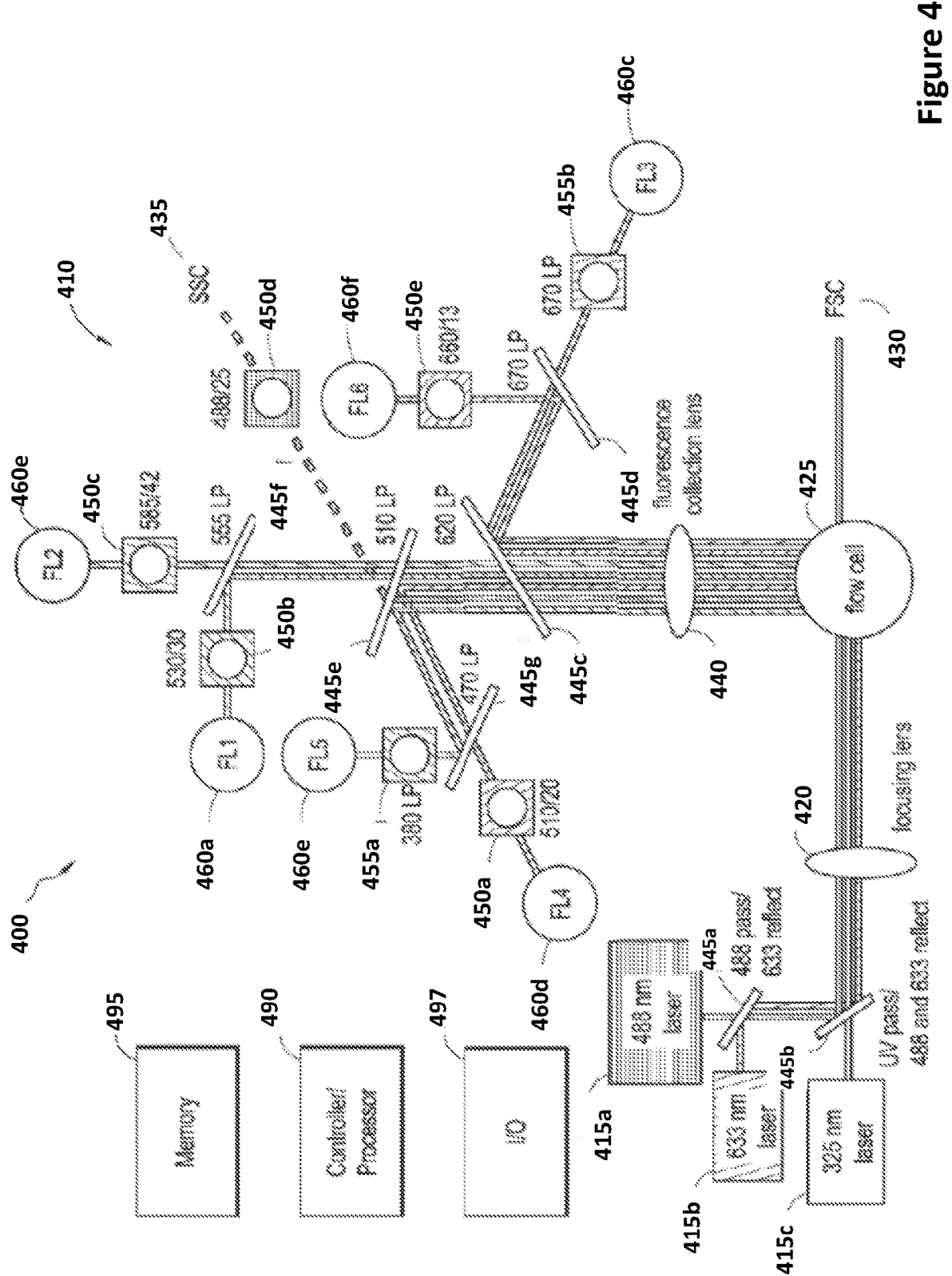
FIG. 4 depicts a flow cytometer according to certain embodiments.

FIG. 4 shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-

415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 415a-c emit light in the form of a laser beam. The wavelengths of the laser beams emitted from excitation lasers 415a-415c are 488 nm, 633 nm, and 325 nm, respectively, in the example system of FIG. 4. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 shortpass beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 490 comprises at least one general purpose processor as well as a plurality of parallel processing units and is coupled to the detectors to receive the output signals therefrom and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data, including one or more histograms of cytometric data, to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
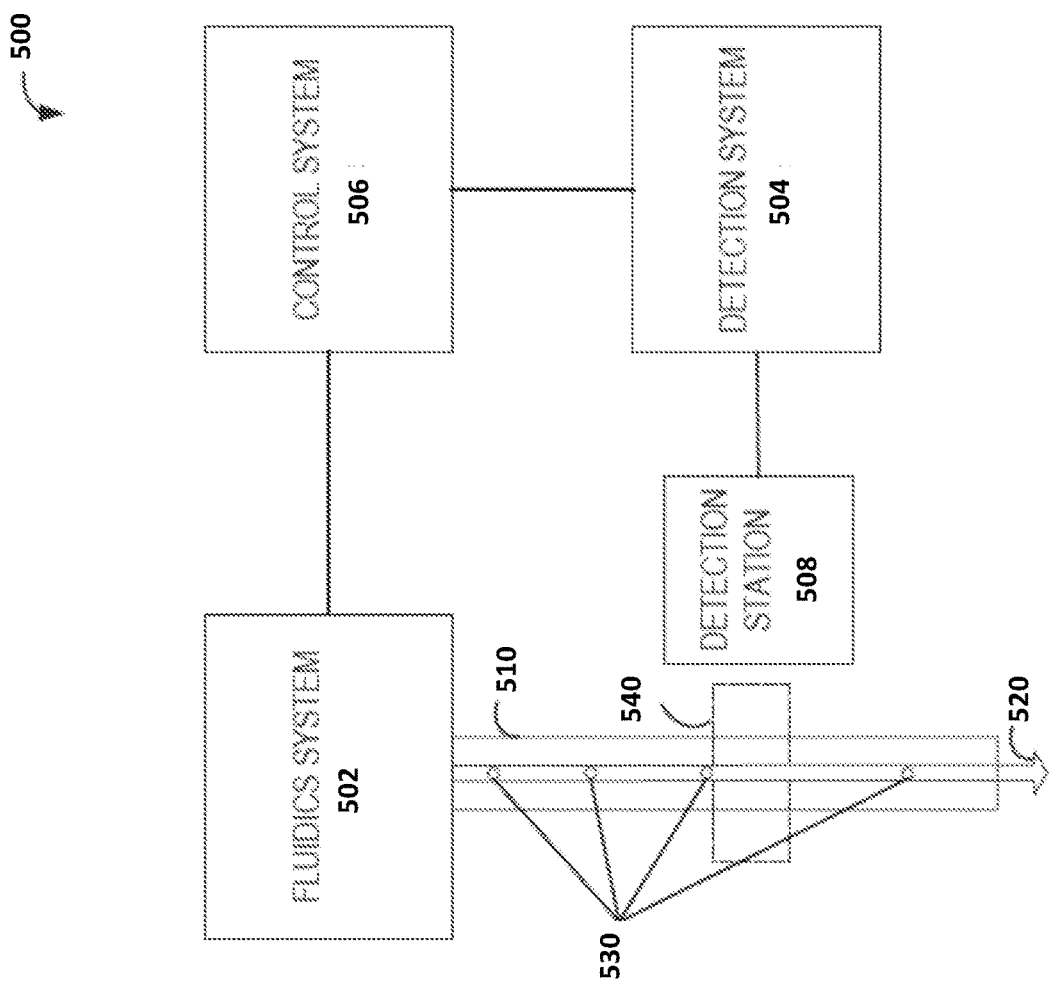
FIG. 5 depicts a functional block diagram of a particle analysis system for sample analysis and particle characterization according to certain embodiments.

FIG. 5 shows a functional block diagram of a particle analysis system for computational based sample analysis and particle characterization. In some embodiments, the particle analysis system 500 is a flow system. The particle analysis system 500 shown in FIG. 5 can be configured to perform aspects of the methods described herein. The particle analysis system 500 includes a fluidics system 502. The fluidics system 502 can include or be coupled with a sample tube 510 and a moving fluid column within the sample tube in which particles 530 (e.g., cells) of a sample move along a common sample path 520.

The particle analysis system 500 includes a detection system 504 configured to collect a signal from each particle as it passes one or more detection stations along the common sample path. A detection station 508 generally refers to a monitored area 540 of the common sample path. Detection can, in some implementations, include detecting light or one or more other properties of the particles 530 as they pass through a monitored area 540. In FIG. 5, one detection station 508 with one monitored area 540 is shown. Some implementations of the particle analysis system 500 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 504 is configured to collect a succession of such data points in a first time interval.

Figure 6A:
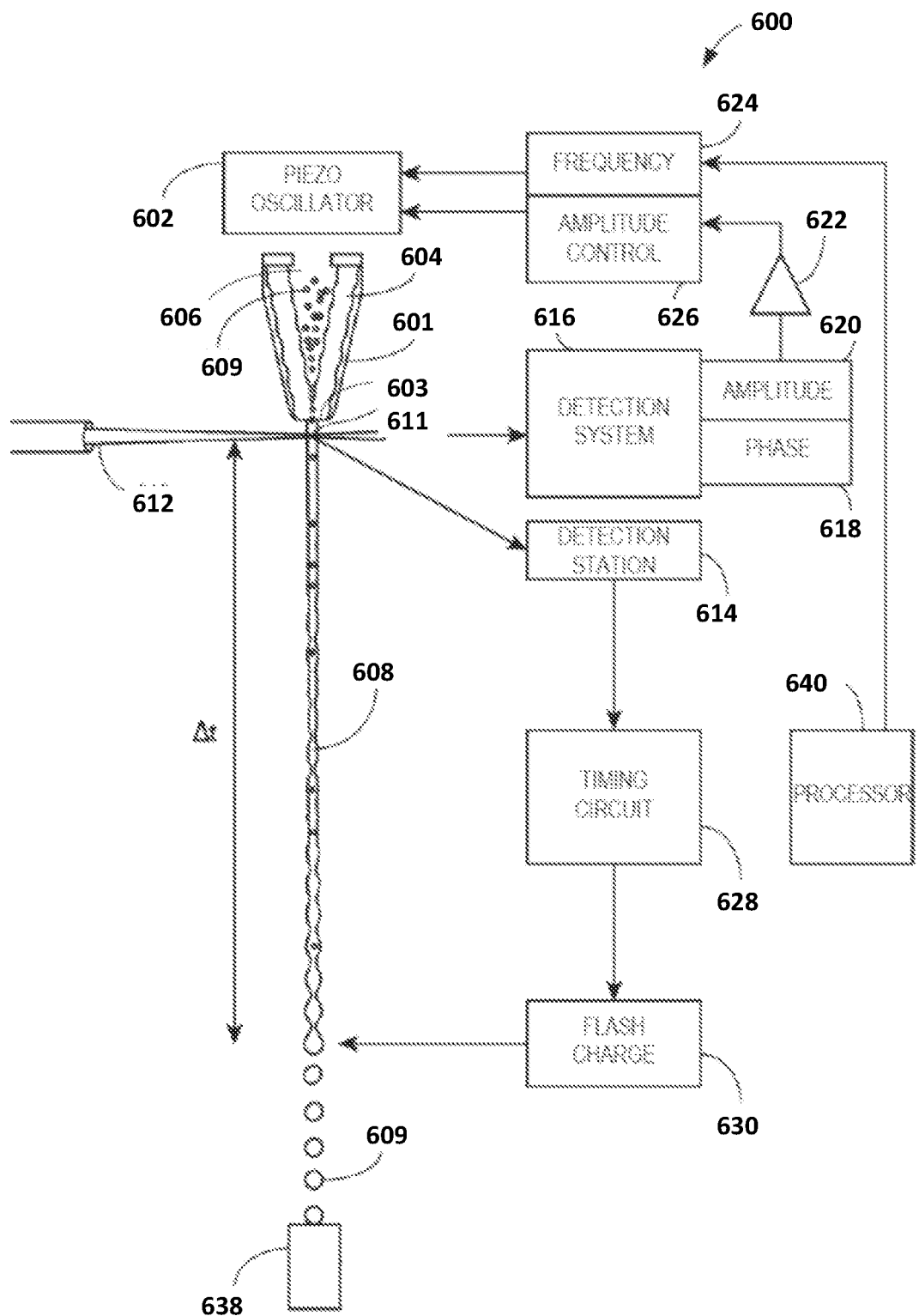
FIG. 6A depicts a schematic drawing of a particle analyzer and sorter system according to certain embodiments.

The particle analysis system 500 can also include a control system 506. The control system 506 can include one or more general purpose processors, a plurality of parallel processing units, an amplitude control circuit 626 and/or a frequency control circuit 624 as shown in FIG. 6A and discussed below. The control system 506 shown can be operationally associated with the fluidics system 502. The control system 506 can be configured to generate a calculated signal frequency for at least a portion of the first time interval based on a Poisson distribution and the number of data points collected by the detection system 504 during the first time interval. The control system 506 can be further configured to generate an experimental signal frequency based on the number of data points in the portion of the first time interval. The control system 506 can additionally compare the experimental signal frequency with that of a calculated signal frequency or a predetermined signal frequency. In addition, the control system 506 can be configured to generate a representation of a histogram of cytometric data by encoding the histogram. The control system 506 can generate a representation of a histogram by assigning a color to each histogram value substantially concurrently using the plurality of parallel processing units and subsequently duplicating the encodings of colors corresponding to histogram values, for example using the general purpose processor.

FIG. 6A is a schematic drawing of a particle analyzer and sorter system 600 (e.g., the particle analyzer 302 as shown in FIG. 3) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g., a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (Δt), a flash charge can be applied to the moving fluid column 608 such that a drop of interest carries a charge. The drop of interest can include one or more particles or cells to be sorted. The charged drop can then be sorted by activating deflection plates (not shown) to deflect the drop into partitions, for example, a vessel such as a collection tube or a multi-well or microwell sample plate where a partition or a well or a microwell can be associated with drops of particular interest. As shown in FIG. 6A, the drops can be collected in a drain receptacle 638.

A detection system 616 (e.g., a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
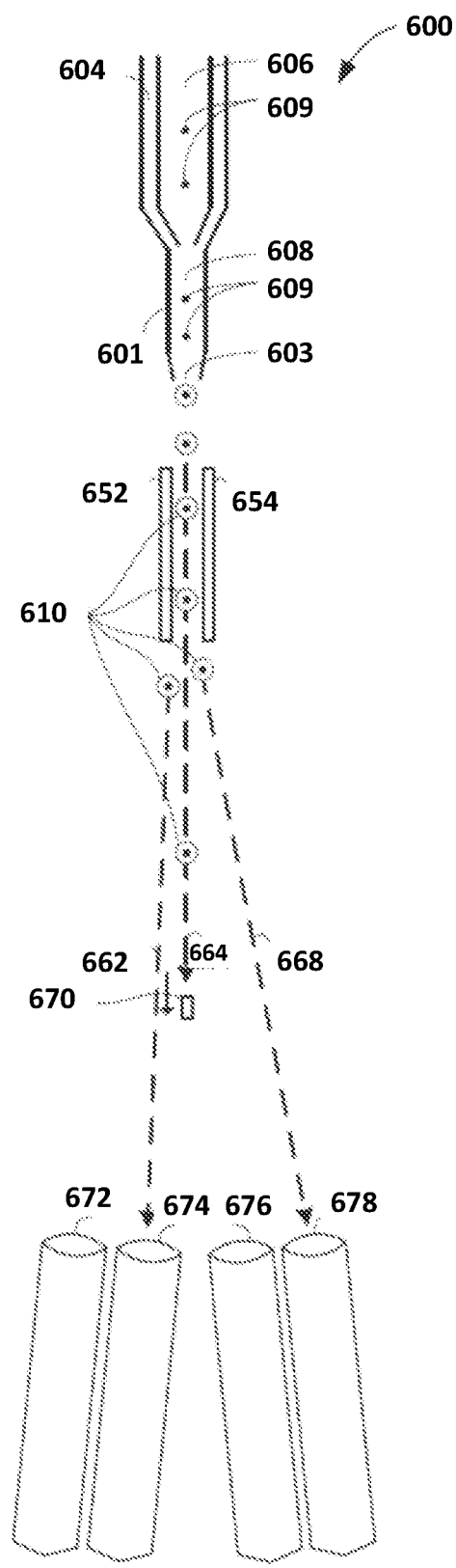
FIG. 6B depicts a schematic drawing of a particle analyzer and sorter system according to certain embodiments.

FIG. 6B is a schematic drawing of a particle analyzer and sorter system, in accordance with one embodiment presented herein. The particle analyzer and sorter system 600 shown in FIG. 6B includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678), such as a partition. As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, N.J.).

In some embodiments, one or more components described for the particle analyzer and sorter system 600 can be used to analyze and characterize particles, with or without physically sorting the particles into collection vessels. Likewise, one or more components described above for the particle analysis system 500 (FIG. 5) can be used to analyze and characterize particles, with or without physically sorting the particles into collection vessels. For example, particles can be grouped or displayed in a tree that includes at least three groups as described herein or alternatively, could be displayed in one or more histogram formats, using one or more of the components of the particle sorter system 600 or particle analysis system 500.

Systems according to some embodiments, may include a display and operator input device. Operator input devices may, for example, be a keyboard, mouse, or the like. The processing module includes at least one general purpose processor as well as a plurality of parallel processing units, all of which have access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The general purpose processor as well as each of the parallel processing units may be a commercially available processor, or it may be one of other processors that are or will become available. The processors execute the operating system, and the operating system interfaces with firmware and hardware in a well-known manner and facilitates the processors in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processors may be any suitable analog or digital systems. In some embodiments, the one or more general purpose processors as well as the parallel processing units include analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disc drive, a tape drive, a removable hard disk drive, or a diskette drive. Such types of memory storage devices typically read from, and/or write to, a program storage medium (not shown) such as, respectively, a compact disc, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor of the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the one or more general purpose processors as well as the plurality of parallel processing units, such as a graphics processor, can store and retrieve data, such as magnetic, optical, or solid-state storage devices (including magnetic or optical disks or tape or RAM, or any other suitable device, either fixed or portable). The general purpose processor may include a general-purpose digital microprocessor suitably programmed from a computer readable medium carrying necessary program code. The parallel processing units may include one or more graphics processors suitably programmed from a computer readable medium carrying necessary program code. Programming can be provided remotely to the processors through one or more communication channels, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The one or more general purpose processors may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via a system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located, or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Figure 7:
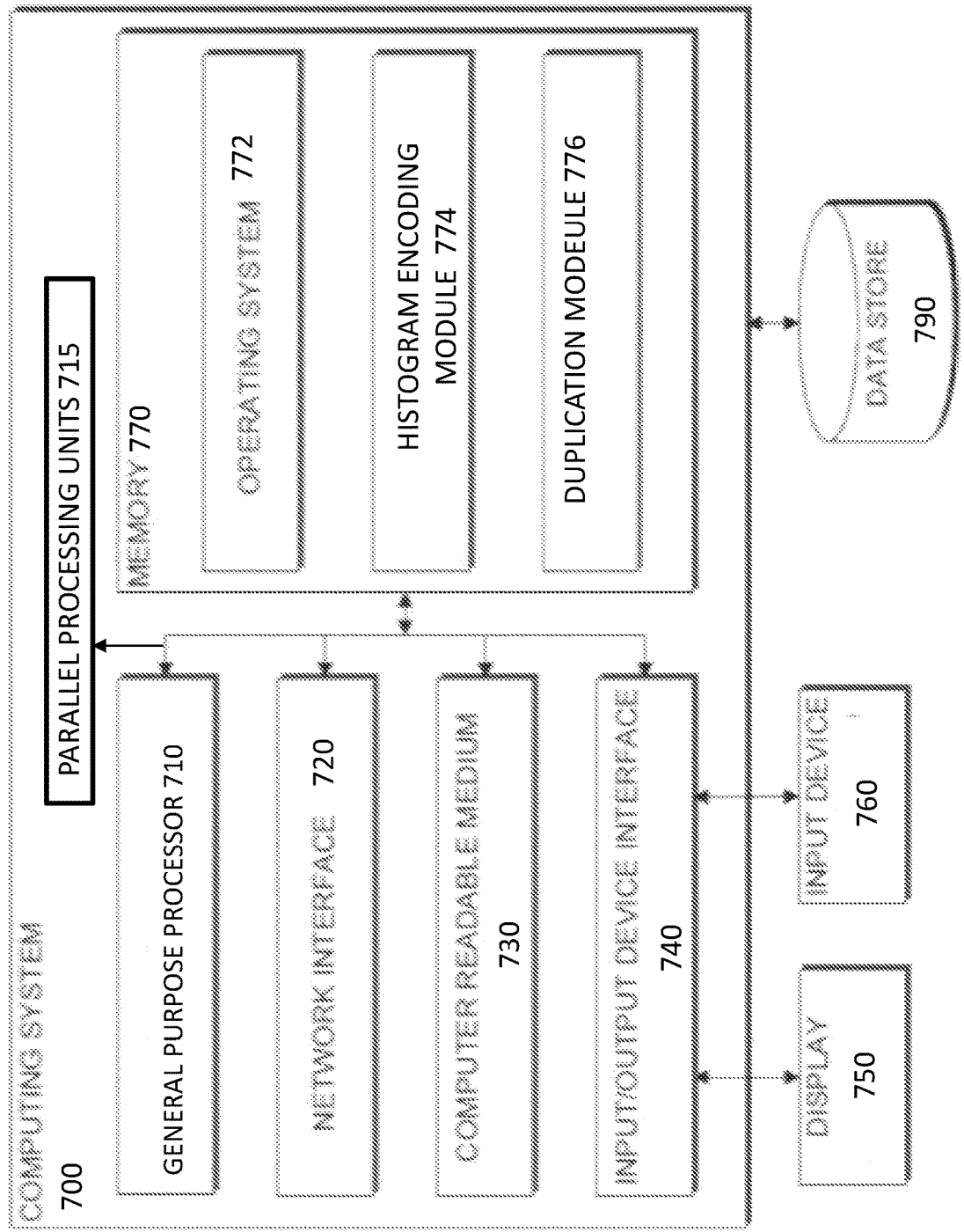
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit consisting of one or more general purpose processors 710, a plurality of parallel processing units 715, a network interface 720, a computer readable medium drive 730, an input/output device interface 740, a display 750, and an input device 760, all of which may communicate with one another by way of a communication bus. The network interface 720 may provide connectivity to one or more networks or computing systems. The general purpose processor 710 as well as the parallel processing units 715 may thus receive information and instructions from other computing systems or services via a network. The general purpose processor 710 as well as the parallel processing units 715 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the general purpose processor 710 and/or the parallel processing units 715 execute in order to implement one or more embodiments. The memory 770 generally includes RAM, ROM and/or other persistent, auxiliary or non-transitory computer-readable media. The memory 770 may store an operating system 772 that provides computer program instructions for use by each of the one or more general purpose processors and the plurality of parallel processing units 710 in the general administration and operation of the computing device 700. The memory 770 may further include computer program instructions and other information for implementing aspects of the present disclosure.

For example, in one embodiment, the memory 770 includes a histogram encoding module 774 for generating a representation of a histogram by encoding the histogram, the encoding comprising assigning an encoding of a color to each histogram value in the representation of the histogram and an encoding duplication module 776 for duplicating encodings of colors corresponding to the histogram values in the representation of the histogram a predetermined number of times.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5): 502-11; Alison, et al. J Pathol, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

Computer-Readable Storage Medium for Processing and Displaying Multi-Channel Spectral Histograms Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming," where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on a computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others. In some embodiments, computer readable storage media of interest include a computer program stored thereon, where the computer program when loaded on the computer includes instructions having: algorithm for obtaining a histogram of cytometric data for a sample, wherein the cytometric data comprises measurements from particles irradiated in the sample flowing in a flow stream; algorithm for generating the representation of the histogram by encoding the histogram, the encoding comprising: assigning a color to each histogram value in the representation of the histogram; and duplicating each color corresponding to each histogram value in the representation of the histogram a predetermined number of times; and algorithm for using the representation of the histogram for displaying the histogram.

In embodiments, computer readable storage media of interest may be configured such that algorithm using the representation of the histogram for displaying the histogram comprises algorithm for using the representation of the histogram for displaying the histogram on a display device.

The computer readable storage medium may also include algorithm for determining the maximum value in the bins of the histogram; and algorithm for using the maximum value to determine a scale factor for assigning colors to histogram values. In embodiments, computer readable storage media of interest may be configured such that assigning a color to a histogram value in the representation of the histogram comprises: using the scale factor to scale the histogram value to produce a scaled histogram value; and assigning a color corresponding to the histogram value based on the scaled histogram value. In other embodiments, the computer readable storage medium may also include algorithm for obtaining a color palette comprising available colors for the histogram representation; and algorithm for using the scaled histogram value to access the color palette to determine the color corresponding to the histogram value. In still other embodiments, computer readable storage media of interest may be configured such that the color palette is an array of different colors, and may further comprise algorithm for using the scaled histogram value to access the color palette comprises algorithm for using the scaled histogram value to index into the color palette array.

In embodiments, computer readable storage media of interest may be configured such that colors are assigned to a plurality of histogram values substantially concurrently. The computer readable storage medium may also include algorithm for using a plurality of parallel processing units to assign colors to a plurality of histogram values substantially concurrently.

In other embodiments, computer readable storage media of interest may further comprise algorithm for determining whether a detector channel is saturated. For example, algorithm for determining whether a detector channel is saturated may comprise algorithm for determining whether a percentage oversaturated of a detector channel is greater than a predetermined threshold, wherein the percentage over-saturated of a detector channel comprises a ratio of a count of all particle measurements that fall outside established histogram bins to a count of all particle measurements. The predetermined threshold for saturation may be any convenient percentage, such as, for example, 1% or more, 2% or more, 5% or more, 10% or more, 25% or more, or 50% or more or 75% or more. Certain embodiments may further comprise algorithm for causing display of a saturation user interface corresponding to a saturated detector channel. In some cases, the saturation user interface comprises a prompt to adjust a setting of the saturated detector channel.

In still other embodiments, computer readable storage media of interest may include algorithm for obtaining a plurality of histograms of cytometric data for a sample; algorithm for generating the representations of the plurality of histograms according to any of the instructions of the non-transitory computer readable storage medium for generating a representation of a single histogram described herein; and algorithm for using the representations of the plurality of histograms for displaying the plurality of histograms. The computer readable storage medium may be configured such that algorithm for using the representations of the plurality of histograms for displaying the plurality of histograms comprises algorithm for using the representations of the plurality of histograms for displaying the plurality of histograms on a display device. In other embodiments, computer readable storage media of interest may include algorithm for generating a representation of each histogram of the plurality of histograms comprises algorithm for generating the representation of more than one histogram substantially concurrently. In still other embodiments, computer readable storage media of interest may be configured such that algorithm for generating representations of each histogram of the plurality of histograms is algorithm for generating representations of a plurality of histograms substantially in real time.

In embodiments where representations of a plurality of histograms are generated, computer readable storage media of interest may further comprise algorithm for causing display of a saturation user interface corresponding to a saturated detector channel. In some cases, the saturation user interface comprises displaying the percentage over-saturated of the saturated detector channel. In other cases, the saturation user interface comprises a prompt to adjust a setting of the saturated detector channel.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Utility

The subject systems, methods and computer systems find use in a variety of applications where it is desirable to analyze and sort particle components, such as cells, in a sample in a fluid medium, such as a biological sample. In some embodiments, the systems and methods described herein find use in flow cytometry characterization of biological samples labeled with fluorescent tags. In other embodiments, the systems and methods find use in spectroscopy of emitted light. In addition, the subject systems and methods find use in improving the efficiency and effectiveness of sorting a sample (e.g., in a flow stream). By improving the efficiency of sorting a sample, it is meant that fewer particles, such as cells, of a sample may be mischaracterized or misunderstood, due to, for example, improper calibration of a detection system, when sorting or analyzing a sample when the subject systems and methods are employed. In particular, the subject systems and methods may improve efficiency and effectiveness of analyzing or sorting and in particular reduce the number of cells wasted in the context of sorting when a channel of a detector used to analyze and/or sort a sample is incorrectly calibrated, such as when the channel of the detector is saturated. Embodiments of the present disclosure find use where it is desirable to provide a flow cytometer with improved cell sorting efficiency, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for analyzing and/or separating and collecting cells from a biological sample (e.g., organ, tissue, tissue fragment, fluid) with enhanced effectiveness and efficiency and low cost as compared to traditional flow cytometry systems.

The following is offered by way of illustration and not by way of limitation.

EXPERIMENTAL

The following example relates to a computer-based implementation of the present invention and is offered by way of illustration and not by way of limitation.

Processing and Memory Requirements

As discussed above, FIG. 2 depicts results from six detectors with a total of eighty channels of histogram information. While the compact display of dozens of channels of measurements of light intensity, such as that shown in FIG. 2, is convenient, the processing power required to produce such a display is substantial. The processing power required may even be limiting, especially in the context of interfacing with instrumentation, such as flow-based particle analyzers. Every histogram bin for every detector channel has a value that must be ultimately be turned into a color, i.e., encoded and then displayed as a color. In order to adequately reflect measurements from, for example, a particle analyzer, this process must be repeated at a high frequency, for example, up to thirty times per second.

In addition, the display may be used by an operator to make decisions regarding detector settings. For example, the gain for each channel may be adjusted such that the value of the adjusted gain setting must be transmitted to the instrument, such as a particle analyzer, to adjust the corresponding detector electronics.

To handle all the processing that must be done, the technique according to the present invention is a form of a computation pipeline that processes the histograms in parallel, for example, using a Graphics Processing Unit (GPU). Such GPU may consist of hundreds of processing units that work in parallel and may be installed on a graphics video card. The GPU may be programmed using a programming API.

When working with the GPU, histogram data and other information required for processing must be transferred from the central processing unit (CPU) to the GPU. This is a time-consuming operation and can be optimized by reducing the memory required. To accomplish this optimization, histogram memory requirements should be as small as possible. Since memory accesses are typically high-latency operations, reducing the memory required can have the result of reducing the number of memory accesses required and therefore reducing the latency of the operation.

As an illustrative example of how much memory would be required without optimizing, consider histograms for 80 channels that are displayed on a display screen using a 20 pixel width size for each histogram display. That is, the display of each histogram is "stretched" laterally by 20 pixels. Suppose each histogram include 256 bins. The display of each histogram in the user interface (UI), therefore, requires 20 pixels in width and 256 pixels in height. The memory required for such a histogram is calculated by multiplying the width times the height times the number of color channels (in this case, four). This means that to display a single histogram, the memory requirement is at least: 20×256×4 or 20,480 bytes. That is, in this example, at least 20,480 bytes of memory are required for a representation of a single histogram. To compute the total amount of memory required for the plurality of histograms, each corresponding to a different channel, this result is multiplied by the number of histogram channels, which in this example is 80. In total, to process and display all the histograms in the plurality of 80 histograms would require at least 80×20,480 or 1,638,400 bytes of memory.

This is a substantial amount of memory. This is especially a substantial amount of memory in the context of interfacing with instrumentation that may have more limited memory constrains, processing capacity or bus or other transmission bandwidth. Furthermore, when real-time acquisition is involved (requiring updating a display of a plurality of histograms at, for example, 30 frames per second (fps)), then 30×1,638,400 or 49,152,000 bytes per second need to be uploaded and downloaded to and from the GPU. This rate of data manipulation is challenging to achieve given typical hardware and software constraints.

Embodiments of the present invention may reduce memory usage by encoding each histogram that will be rendered to the display surface using a pixel dimension of 1×256, when the histogram consists of 256 bins. When four color channels are used, this will result in a total memory footprint for a single histogram of 4×256 or 1,024 bytes. This is a reduction of 20 times as compared with the 20,480 byte requirement discussed above, when the present invention is not employed. With eighty channels of histograms, the exemplary method according to the present invention would result in a memory footprint of 80×1,024 or 81,920 bytes, substantially smaller than the previous estimate of at least 1,638,400 bytes required to represent eighty histograms. After leveraging the GPU to generate a representation of the histogram in the 1×256 pixel dimension, post-processing by the general purpose CPU may be applied to complete the representation of the histogram and to render the color-encoded histogram to the screen. It is desirable for the actual display to a user to be much larger, for example, with a width of 20 pixels, but the operations required to duplicate each color corresponding to each histogram value in the representation of the histogram a predetermined number of times (i.e., 20 times) is, relatively, a very fast operation.

Figure 8:
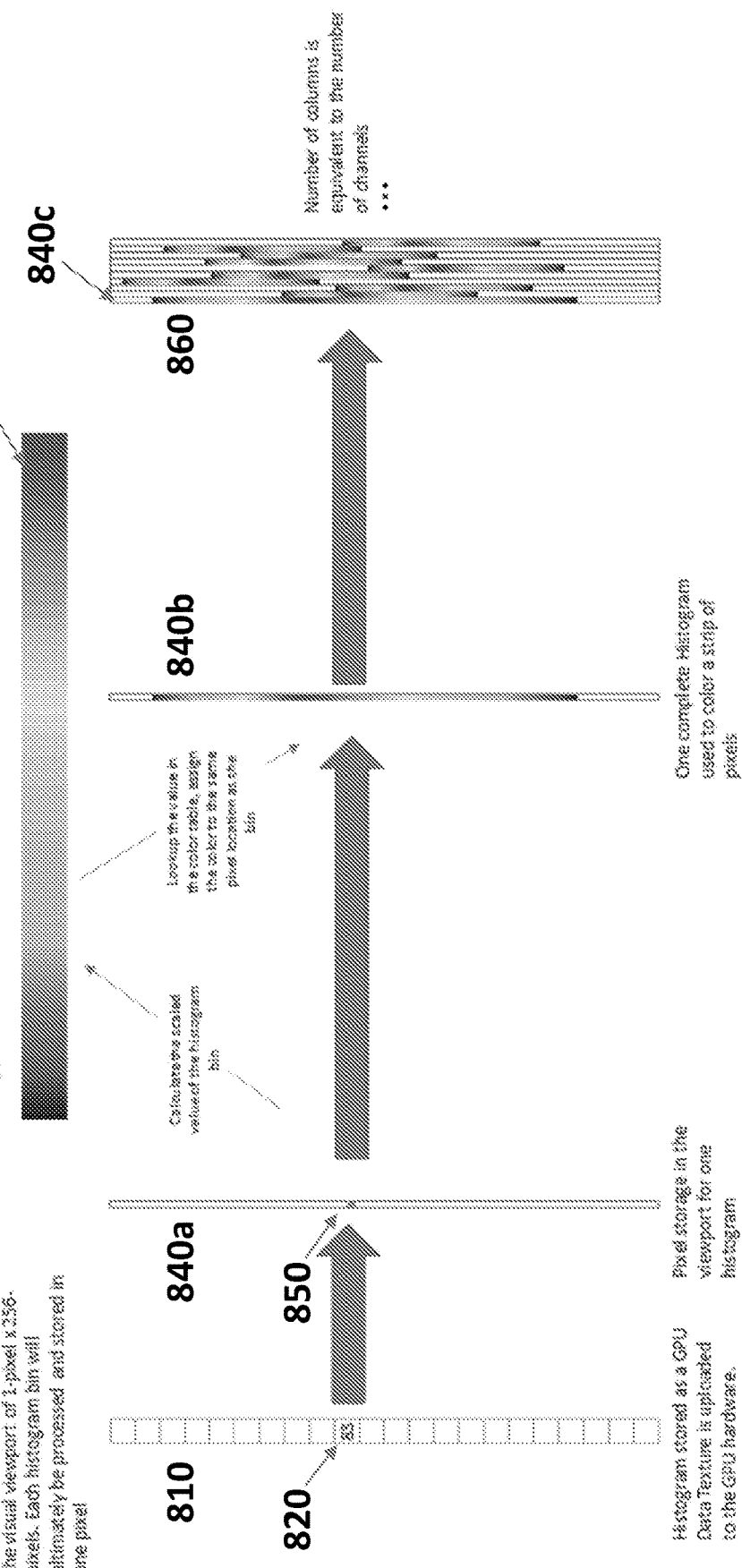
FIG. 8 depicts an illustration of processing a plurality of histograms according to embodiments of the present invention.

FIG. 8 illustrates processing of a plurality of histograms according to embodiments of the present invention. On the left, histogram 810 of cytometric data has bin 820 with a value of 83. Histogram 810 of cytometric data is a one dimensional array of data values, where each array entry corresponds to a histogram bin. The histogram value at bin 820 is scaled to fit within the range of display colors, in this example, 256 colors, shown in color palette 830. The color corresponding to histogram value 83, and the encoding therefor, is extracted from color palette 830 and is assigned to pixel value 850 in representation of the histogram 840a, stored in the drawing area of the GPU. To assign the color corresponding to histogram bin 820, a scaled value of histogram value 83 is used to index into color palette 830. Upon repeating this process for every histogram value, eventually all 256 bins of histogram 810 of cytometric data have their corresponding colors assigned resulting in representation of the histogram 840b, the same representation of the histogram now shown with all colors assigned and still stored in the drawing area of the GPU. This process is continued and done for all histograms in the plurality of histograms 860. Completed representation of histogram 840b is included in the plurality of histograms 860, shown as representation of histogram 840c. As illustrated in FIG. 8, the number of columns of the plurality of histograms 860 is equal to the number of individual histograms, each corresponding to a different detector channel.

The result of the processing described above is the representations of the plurality of histograms 860 have every histogram bin encoded with a color assigned based on the corresponding histogram values, and the drawing area of the GPU is completely colored with such assigned colors. This drawing area of the GPU, storing the representations of the plurality of histograms, is transferred to the CPU using a drawing call, or similar API function call. At this point, however, there is nothing displayed or otherwise visible on a screen. This is the next step in the process. The representations of the plurality of histograms 860, or drawing canvas, is the source of all the histogram colors, albeit each histogram in the representations of the plurality of histograms 860 is, at this point in the process, only one pixel wide. The next step takes a strip of the representation of the histogram that is 1×256 and draws it to another destination canvas, but the image is "stretched" a predetermined number of times to the desired width, which in this case is 20 pixels.

Render Processing

Render processing, as discussed above, is described in greater detail below in the context of processing by the parallel processing units of a GPU.

Figure 9:
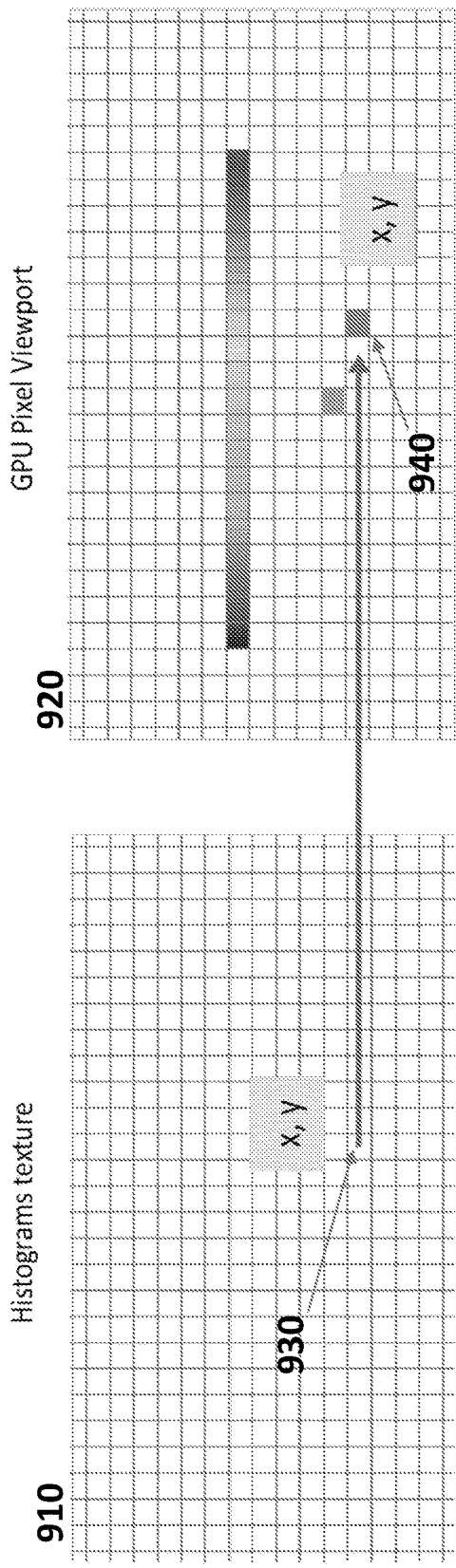
FIG. 9 depicts an illustration of another view of generating a representation of a histogram according to the present invention.

During render processing by the parallel processing units of a GPU, every pixel position/color in the representation of a histogram corresponds to a histogram/bin position. FIG. 9 illustrates another view of this process. The optimization taken in the present invention is that positions in the representation of a plurality of histograms 920, i.e., a pixel viewport, exactly matches the array of histogram values of the plurality of histograms 910. Pixel values are input for GPU processing at 910 with x and y position information, identifying the histogram and the histogram bin. The x value is used as the bin value, and the y value is the histogram of interest.

Such identifiers of the bin value and the histogram of interest are used as the lookup information to get histogram value, such as histogram value 930, in the plurality of histograms 910. Once the color information has been retrieved, the pixel location in the representation of histograms 920 is set. As seen in FIG. 9, histogram value 930 is located within histogram data 910 at a position that corresponds to an entry 940 in the representation of the plurality of histograms 920. That is, both entries have the same x and y coordinates within the input data of the plurality of histograms 910 and the representations of the plurality of histograms 920.

In the context of a hardware implementation, depending on the quality of the video card, the GPU will have a set of processors for working on each pixel in parallel. This results in a very high-speed processing of the histograms to generate the representations of the plurality of histograms.

Post Processing of the Histogram

Figure 10:
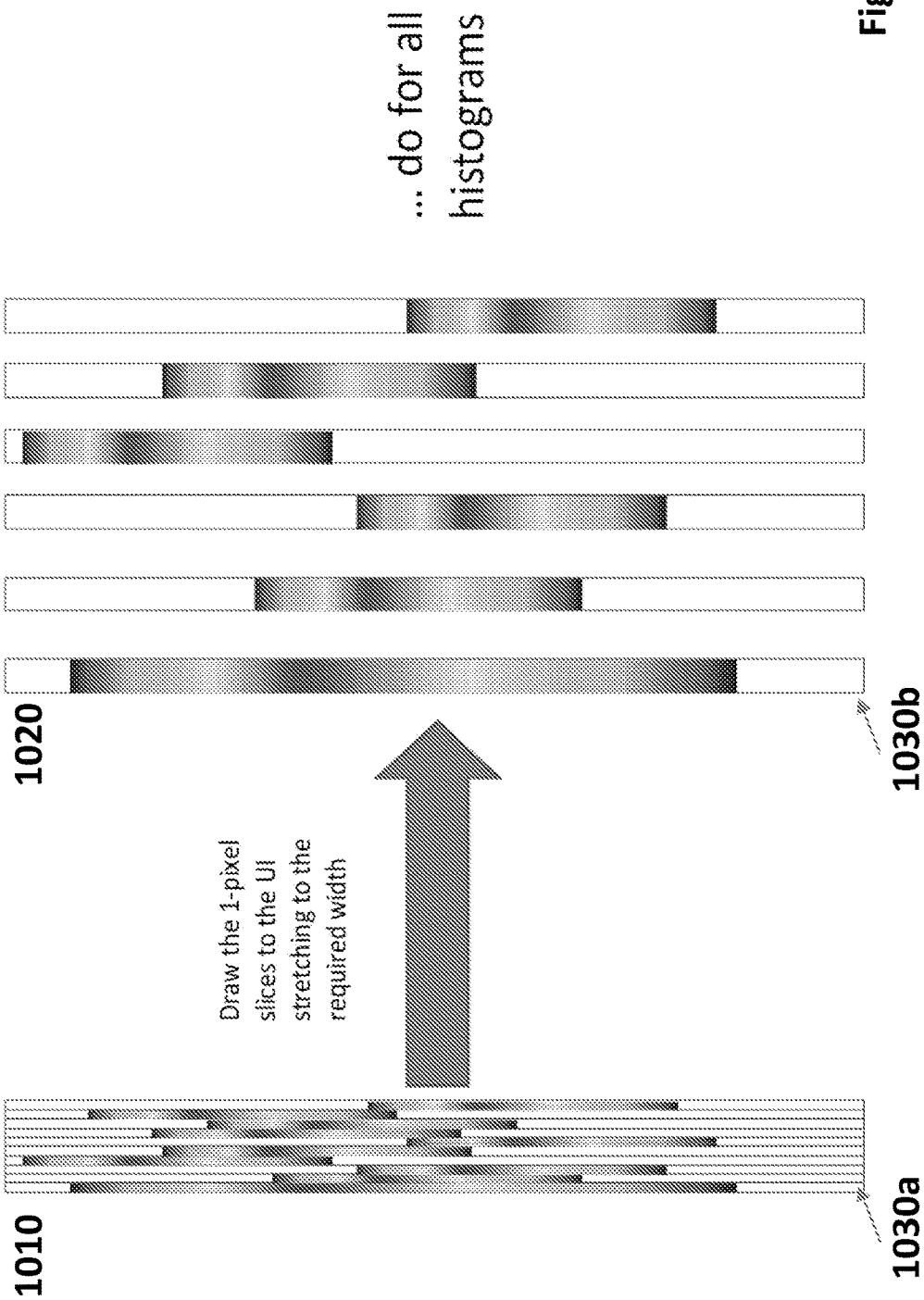
FIG. 10 depicts an illustration of the process of duplicating each color corresponding to each histogram value in the representation of the histogram a predetermined number of times according to an embodiment.

After the representations of the plurality of histograms are generated comprising a single pixel width, as in the representations of the plurality of histograms 860 in FIG. 8, and such representations are projected to the GPU canvas, the representations of the plurality of histograms is then copied to the multiple canvases related to the user interface. FIG. 10 illustrates this process of "stretching" the width of each representation of a histogram by duplicating each color corresponding to each histogram value in the representation of the histogram a predetermined number of times. Representations of a plurality of histograms 1010 are each stretched by duplicating each color laterally a predetermined number of times resulting in representations of a plurality of histograms 1020 that are wide enough they can be used to display the plurality of histograms to a user. For example, representation 1030a is stretched by duplicating each color laterally a predetermined number of times resulting in representation of the histogram 1030b. This is a relatively fast operation and is very flexible. If a user interface design change were ever needed or desired, changes to such drawing routine consisting of duplicating each color corresponding to each histogram value in the representation of the histogram a predetermined number of times would only be slight.

At this point, the representations of the plurality of histograms 1010 have been processed into representations of histograms 1020 that are used to display the plurality of histograms such that the colors appear on the screen.

Figure 11:
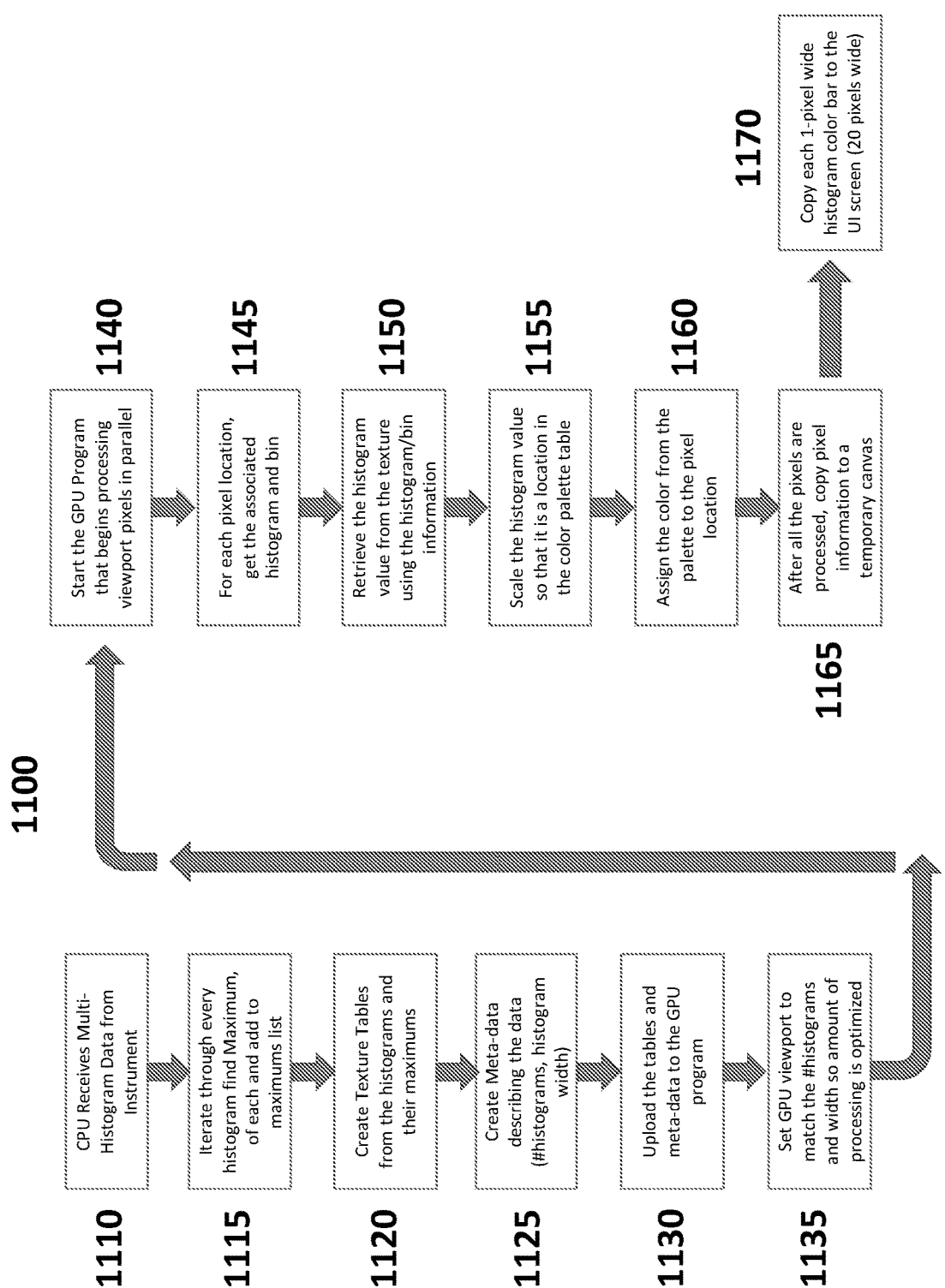
FIG. 11 depicts an overview of an exemplary workflow according to certain embodiments.

An overview of the exemplary workflow 1100 described above is shown in FIG. 11. Exemplary workflow 1100 begins the process of generating representations of a plurality of histograms of cytometric data at step 1110 where the central processing unit (CPU, as opposed to a graphics processing unit) obtains cytometric data in the form of receiving a plurality of histograms of cytometric data from an instrument, such as a particle analyzer. From step 1110, the workflow continues to step 1115. At step 1115, the process iterates through all histogram values of every histogram in order to find a maximum histogram value for each histogram. Such maximum histogram value is the value of the histogram bin with the largest number of measurements for the range of light intensity values corresponding to that histogram bin.

Continuing, the process at step 1120 entails preprocessing histogram data to be operated on by the graphics processing unit, including, in some cases, ordering the plurality of histograms in memory such that the histogram data is recognizable to the GPU as texture table. At step 1125, metadata characterizing the plurality of histograms, the representation of the plurality of histograms and the histogram display is created. In workflow 1100, such data comprises the number of histograms in the plurality of histograms as well as the width of histograms (i.e., a predetermined number of pixels) in the ultimate display of the plurality of histograms. The tables created in step 1120 and the metadata created in step 1125 are uploaded in step 1130 to the graphics processing unit (GPU) such that the GPU software inputs and processes these data elements. In step 1135, the GPU is configured to generate representations of the plurality of histograms consisting of encodings of colors corresponding to histogram values based on the number of histograms and the width of each histogram.

At step 1140, the GPU processing to generate representations of the plurality of histograms begins by initiating one or more software routines on the GPU. Such processing consists, in steps 1145 and 1150, of loading a histogram value from the plurality of histograms, where, based on the configuration of the plurality of histograms in memory, the location of each histogram value also corresponds to the pixel representing that histogram value in the display of the plurality of histograms. That is, as described above, each histogram value may have associated with it, x and y coordinates in the ultimate display of the histogram, where such x and y coordinates also serve to index into one of the plurality of histograms and to index into one histogram bin of the plurality of histogram bins. Having loaded the histogram value, the next step 1155 is to use the maximum value associated with the histogram, in conjunction with the number of colors available in the color palette, to scale the histogram value so that the scaled histogram value can be used to look up a color in the color palette. After the color palette is accessed to obtain the color associated with the histogram value in step 1155, the encoding of the color for that histogram location is stored in the representation of the histogram, which is a pixel location corresponding to the location of the histogram bin in the display of the histogram, in step 1160. Each of steps 1145 through 1160 can be performed substantially simultaneously on a plurality of processing units of the GPU. Such simultaneous processing is enabled because each operation is independent of each other since read and write accesses to the representation of the histograms in memory are to different memory locations and, even though the color palette may be accessed across the different simultaneous processing threads, color palette data is only read and never written thereby reducing resource contention that might otherwise interfere with potential parallel processing.

After all the pixels are processed in the representations of the plurality of histograms, the representations of the plurality of histograms are post processed by copying them to a temporary canvas, a temporary position in memory, in step 1165. Finally, in step 1170, each pixel of each one-pixel-wide representation of a histogram is copied a predetermined number of times, in this case twenty times to form twenty pixel wide representations of histograms, so the representations of the plurality of histograms can be used to display the histograms.

Figure 12:
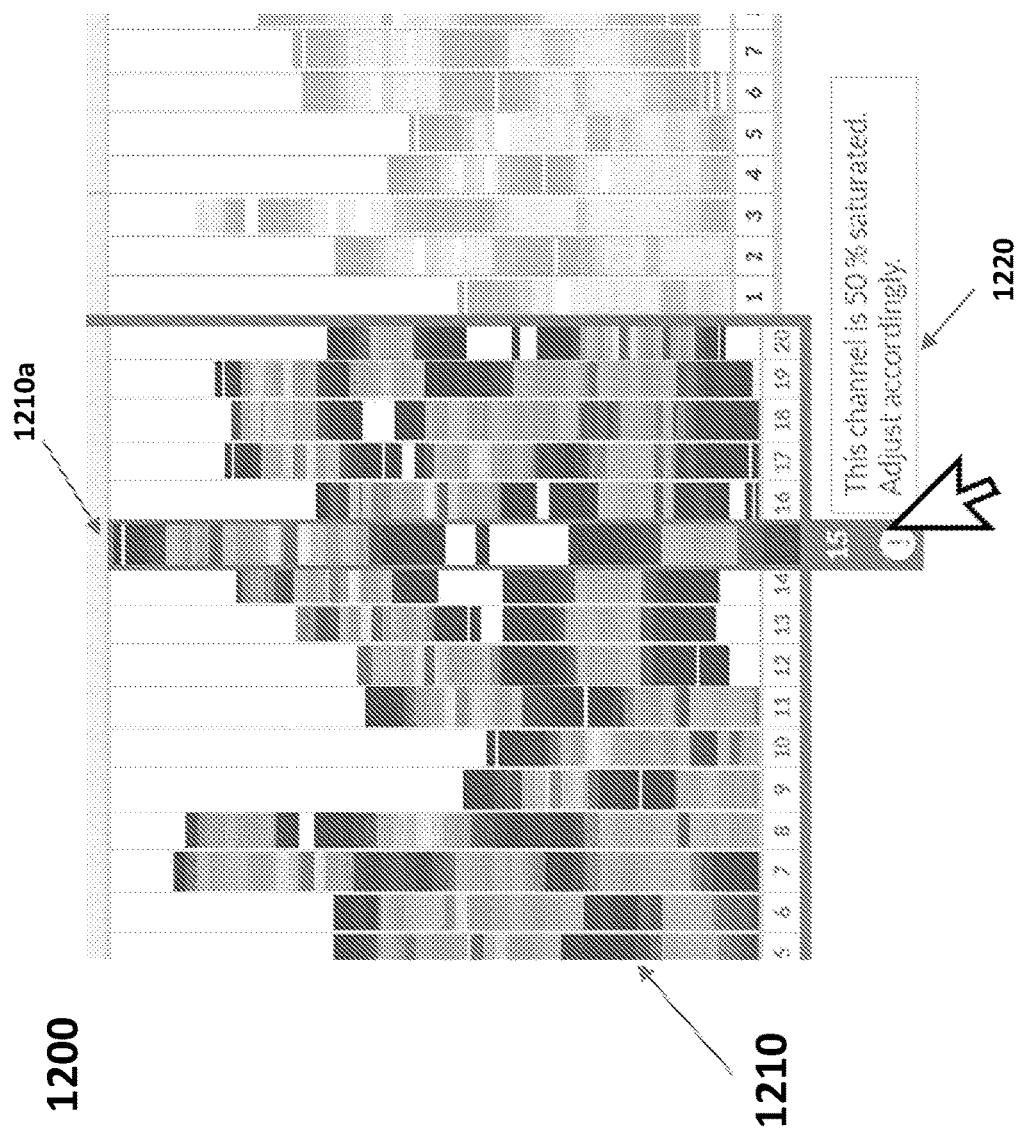
FIG. 12 depicts a display of an exemplary plurality of histograms of cytometric data where a detector channel is saturated, according to certain embodiments.

FIG. 12 shows a display 1200 of a plurality of histograms 1210 according to the present invention. The plurality of histograms 1210 is similar to the plurality of histograms 210 shown in FIG. 2. Individual histogram 1210a of plurality of histograms 1210 corresponds to saturated detector channel 15. Saturation is determined when histogram bin counts are outside an established range of the histogram. That is, saturation of channel detector 15 is detected when a threshold number of measurements corresponding to detector channel fall outside an established range of bins for histogram 1210a.

Because detector channel 15 is saturated, individual histogram 1210a is shown as emphasized and as blown up compared with other histograms in the display of plurality of histograms 1210 and by including the display of an exclamation mark near histogram 1210a. These additional display features are included to notify the user that individual histogram 1210a indicates channel detector 15 is saturated and may be displayed as soon as it is detected that histogram 1210a corresponds to a saturated channel detector. Saturation user interface 1220 corresponding to individual histogram 1210a is also displayed when detector channel 15 becomes saturated. Saturation user interface 1220 includes the percentage over-saturated for saturated detector channel 15, describing that the channel is 50% saturated. The percentage over-saturated is a calculation done using the number of measurements, i.e., events, outside the range of histogram 1210a, divided by the total number of measurements, i.e., events, making up histogram 1210a. In this case, 50% of the measurements corresponding to channel detector 15 fall outside of the established range of individual histogram 1210a.

In addition, saturation user interface 1220 includes additional text prompting the user to adjust settings of the underlying particle analyzer used to collect the cytometric data, including data parameters obtained via saturated channel detector 15. An adjustment to address detector channel saturation may comprise adjusting the gain of the saturated detector channel. Although not shown in FIG. 12, in some cases, saturation user interface 1220 may display recommendations for adjusting gain settings to mitigate the saturation exhibited by detector channel 15 and exhibited in individual histogram 1210a.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A method of generating a representation of a histogram for displaying the histogram, the method comprising:
   obtaining histogram data corresponding to cytometric data for a sample, wherein the cytometric data comprises measurements from particles irradiated in the sample flowing in a flow stream;
   generating a representation of a histogram by encoding the histogram data, the encoding comprising:
      assigning a color to a plurality of histogram values in the representation of the histogram, in parallel, using scaled histogram values as indices to lookup corresponding colors in a first computer-implemented data structure representing a color palette of available histogram colors; and
      duplicating each color corresponding to each histogram value in the representation of the histogram a predetermined number of times,
   wherein the representation of the histogram (i) comprises a second computer-implemented data structure configured to store colors associated with histogram values and (ii) each element of the representation of the histogram corresponds to a pixel; and
   using the representation of the histogram for displaying the histogram.

2. The method according to claim 1, wherein the cytometric data comprises light measurements from the particles irradiated in the sample.

3. The method according to claim 2, wherein the light measurements are measurements of light intensity.

4. The method according to claim 2, wherein the cytometric data comprises measurements of one or more of:
excitation light that is scattered by the particles along a mostly forward direction;
excitation light that is scattered by the particles along a mostly sideways direction; and
light emitted from fluorescent molecules or fluorescent dyes used to label the particles in one or more ranges of frequencies.

5. The method according to claim 1, wherein
the histogram data comprises a plurality of bins, and
the histogram data values are associated with the histogram bins.

6. The method according to claim 5, wherein each histogram bin corresponds to a range of measurements from the particles irradiated in the sample.

7. The method according to claim 6, wherein the measurements are light intensity measurements.

8. The method according to claim 7, wherein the histogram data is a spectral intensity histogram.

9. The method according to claim 1, wherein using the representation of the histogram for displaying the histogram comprises using the representation of the histogram for displaying the histogram on a display device.

10. The method according to claim 1, wherein the predetermined number is the number of pixels displayed in a lateral direction of the displayed histogram.

11. The method according to claim 1, wherein the shape of the displayed histogram is rectangular, wherein a longitudinal axis of the displayed histogram corresponds to histogram bins, and colors within the displayed histogram correspond to histogram values.

12. The method according to claim 11, wherein different colors in the displayed histogram correspond to different histogram values.

13. The method according to claim 1, wherein the representation of the histogram comprises an array.

14. The method according to claim 1, further comprising:
determining the maximum value in the bins of the histogram data; and
using the maximum value to determine a scale factor for assigning colors to histogram values.

15. The method according to claim 14, wherein assigning a color to a histogram value in the representation of the histogram comprises:
using the scale factor to scale the histogram value to produce a scaled histogram value; and
assigning a color corresponding to the histogram value based on the scaled histogram value.

16. The method according to claim 1, wherein colors are assigned to a plurality of histogram values substantially concurrently.

17. The method according to claim 16, further comprising using a plurality of parallel processing units to assign colors to a plurality of histogram values substantially concurrently.

18. The method according to claim 1, wherein generating the representation of the histogram is performed substantially in real time.

19. The method according to claim 1, further comprising determining whether a detector channel is saturated.

20. The method according to claim 1, further comprising adjusting settings for collecting the cytometric data based on the display of the histogram.

* * * * *